(12) United States Patent
Petrovic et al.

(10) Patent No.: US 7,644,282 B2
(45) Date of Patent: Jan. 5, 2010

(54) PRE-PROCESSED INFORMATION EMBEDDING SYSTEM

(75) Inventors: Rade Petrovic, San Diego, CA (US); Babak Tehranchi, San Diego, CA (US); Joseph M. Winograd, San Diego, CA (US); Douglas Wong, San Diego, CA (US)

(73) Assignee: Verance Corporation, San Diego, CA (US)

( * ) Notice: Subject to any disclaimer, the term of this patent is extended or adjusted under 35 U.S.C. 154(b) by 574 days.

(21) Appl. No.: 11/173,948

(22) Filed: Jul. 1, 2005

(65) Prior Publication Data

US 2006/0005029 A1      Jan. 5, 2006

Related U.S. Application Data

(63) Continuation-in-part of application No. 11/124,465, filed on May 5, 2005, which is a continuation of application No. 09/721,015, filed on Nov. 22, 2000, now Pat. No. 6,912,315, which is a continuation of application No. PCT/US99/11526, filed on May 25, 1999.

(60) Provisional application No. 60/087,017, filed on May 28, 1998.

(51) Int. Cl.
   *G06F 21/00*       (2006.01)
(52) U.S. Cl. ..................................... 713/176
(58) Field of Classification Search ................. 713/176; 382/232
   See application file for complete search history.

(56) References Cited

U.S. PATENT DOCUMENTS 4,176,379 A    11/1979 Wessler et al.

4,199,788 A    4/1980 Tsujimura
4,464,656 A *  8/1984 Nakamura ................ 345/440.1

(Continued)

FOREIGN PATENT DOCUMENTS

| EP | 0 282 734 | 2/1988 |
|---|---|---|
| WO | 00/13136 | 3/2000 |
| WO | 00/56059 | 9/2000 |

OTHER PUBLICATIONS

Epp et al., "Generalized Scattering Matrices for Unit Cell Characterization of Grid Amplifiers and Device De-Embedding", IEEE vol. 2, Jun. 1995, pp. 1288-1291.
Cinea Icc., "Forensic Watermarking", 2004. [http://www.cinea.com/whitepapers/forensic_watermarking.pdf].
Int'l Search Report for PCT/US06/25090 dated May 13, 2008.
Aggarwal, et al. "Multi-Layer Grid Embeddings," IEEE, 1985, pp. 186-196.
Das et al., "Distributed Priority Queues on Hybercube Architectures" IEEE, 1996, pp. 620-627.

*Primary Examiner*—Gilberto Barron, Jr.
*Assistant Examiner*—Samson B Lemma
(74) *Attorney, Agent, or Firm*—Foley & Lardner LLP

(57) ABSTRACT

Methods are provided for embedding auxiliary information in a host content signal which reduce the memory, bandwidth and computational complexity of the embedding and transmission systems. In one embodiment, a first reduced-scale signal is produced which corresponds to the host content embedded with a first logical value and producing a second reduced-scale signal corresponding to the host content embedded with a second logical value. A first set of segments from the first reduced-scale signal may be combined with a second set of segments from the second reduced-scale signal in a pre-defined manner to produce a composite embedded host content. Thus the storage and transmission requirements of the watermarking system are reduced to having to deal with only the original content plus two reduced-scale signals.

12 Claims, 15 Drawing Sheets

U.S. PATENT DOCUMENTS

| | | | |
|---|---|---|---|
| 5,502,576 A | 3/1996 | Ramsay et al. | |
| 5,519,454 A * | 5/1996 | Willis | 348/663 |
| 5,574,898 A | 11/1996 | Leblang et al. | |
| 5,636,292 A * | 6/1997 | Rhoads | 382/232 |
| 5,893,067 A | 4/1999 | Bender et al. | |
| 6,189,123 B1 * | 2/2001 | Anders Nystrom et al. | 714/751 |
| 6,268,866 B1 | 7/2001 | Shibata | |
| 6,285,774 B1 | 9/2001 | Schumann et al. | |
| 6,332,194 B1 | 12/2001 | Bloom et al. | |
| 6,400,826 B1 | 6/2002 | Chen et al. | |
| 6,424,726 B2 | 7/2002 | Nakano et al. | |
| 6,496,591 B1 | 12/2002 | Rhoads | |
| 6,553,127 B1 * | 4/2003 | Kurowski | 382/100 |
| 6,798,893 B1 | 9/2004 | Tanaka | |
| 6,834,345 B2 | 12/2004 | Bloom et al. | |
| 6,912,294 B2 | 6/2005 | Wang et al. | |
| 6,912,315 B1 * | 6/2005 | Wong et al. | 382/232 |
| 6,915,481 B1 | 7/2005 | Tewfik et al. | |
| 6,996,249 B2 | 2/2006 | Miller et al. | |
| 2002/0120849 A1 | 8/2002 | McKinley et al. | |
| 2003/0033321 A1 | 2/2003 | Schrempp et al. | |
| 2003/0185417 A1 | 10/2003 | Alattar et al. | |
| 2003/0187679 A1 | 10/2003 | Odgers et al. | |
| 2003/0190054 A1 | 10/2003 | Troyansky et al. | |
| 2004/0133794 A1 | 7/2004 | Kocher et al. | |
| 2005/0008190 A1 | 1/2005 | Levy et al. | |

* cited by examiner

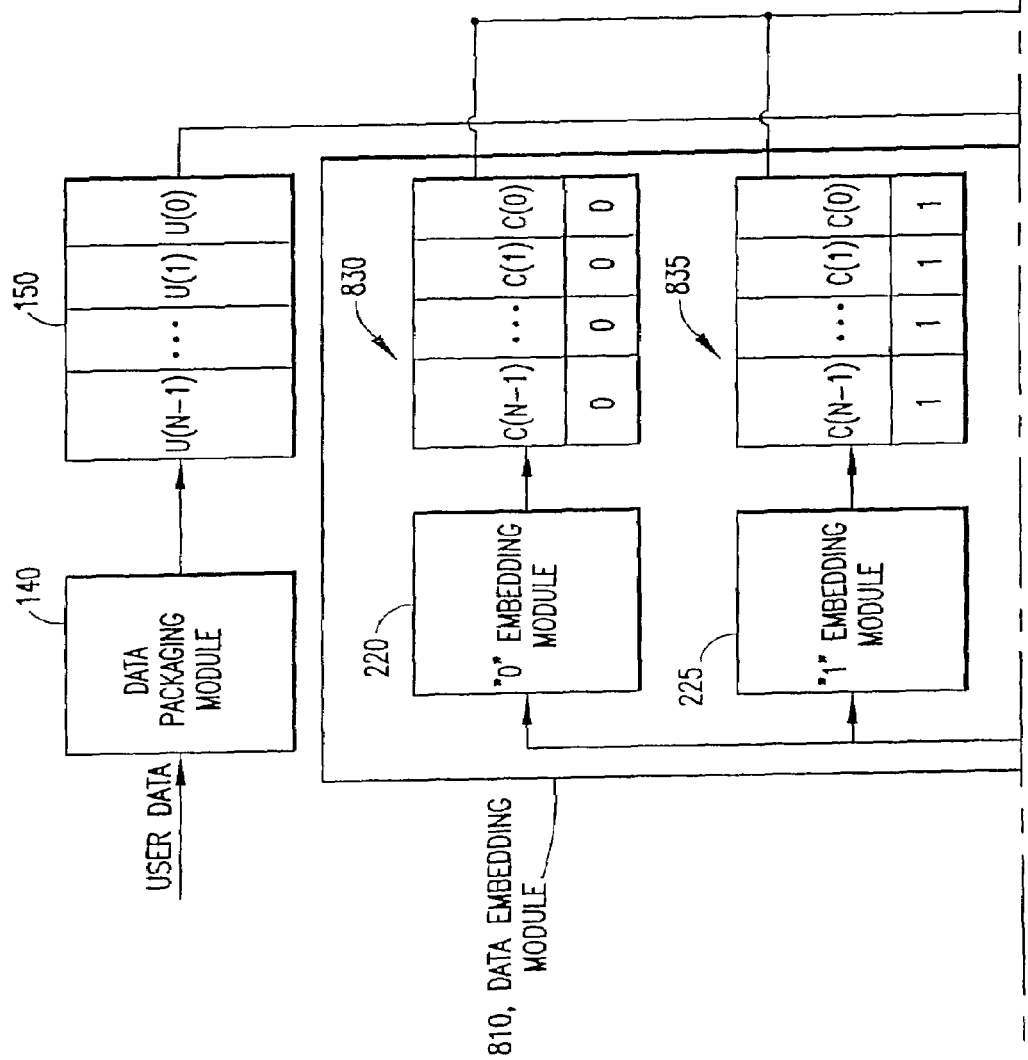

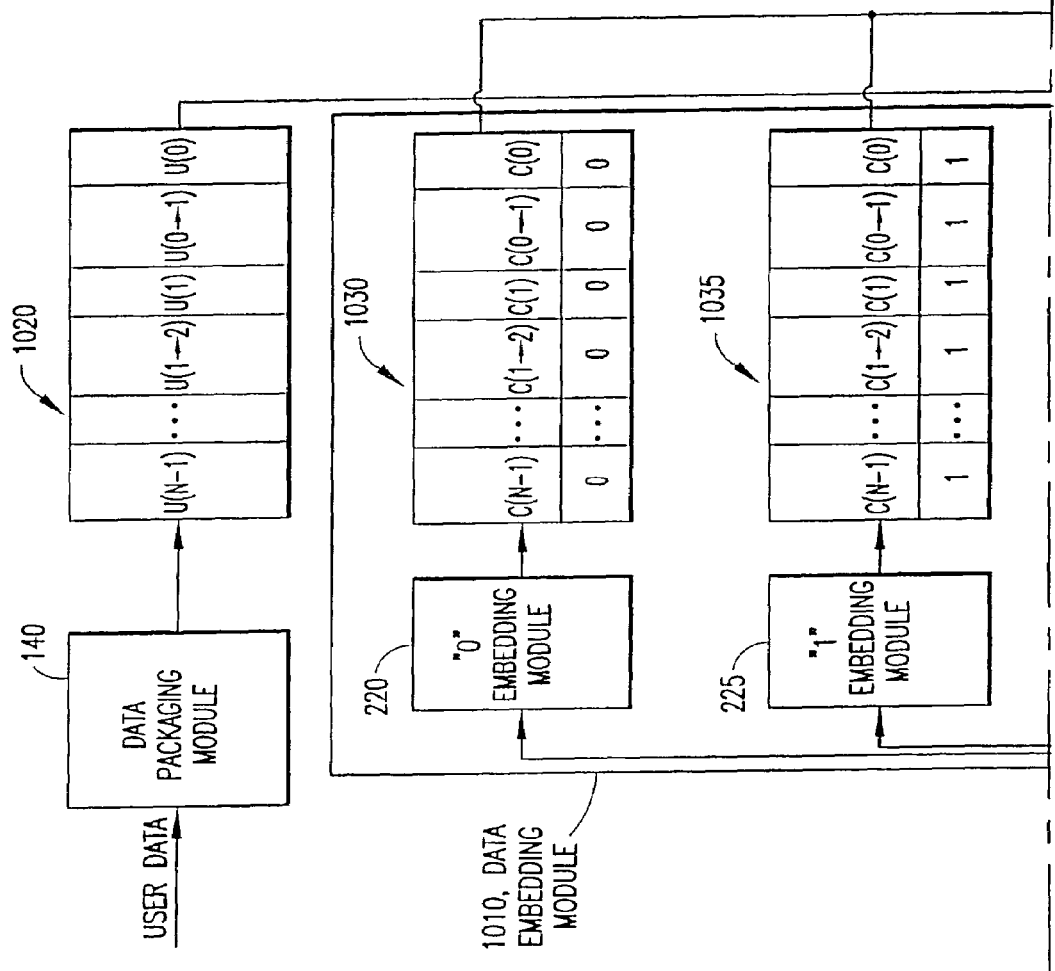

PRE-PROCESSED INFORMATION EMBEDDING SYSTEM

This application is a continuation-in-part of U.S. patent application Ser. No. 11/124,465 filed on May 5, 2005, which is a continuation of U.S. patent application Ser. No. 09/721,015 filed on Nov. 22, 2000 (now U.S. Pat. No. 6,912,315), which is a continuation of International Application No. PCT/US99/11526 filed May 25, 1999, and which claims the benefit of U.S. Provisional Patent Application No. 60/087,017, filed May 28, 1998.

BACKGROUND OF THE INVENTION

The present invention relates to a method and apparatus for providing digital or analog content, such as audio or video, with copy protection data embedded therein.

The ability to transmit copyrighted, namely entertainment content, directly to a typical consumer is increasing rapidly. This is especially true using the Internet, pay-per-view or pay-per-listen systems for cable television networks, and other means.

This increased ability brings with it a number of advantages to reaching the consumer. For example, the consumer may sample the content (e.g., audio or video) while on-line, and purchase the content at any time of the day. However, one clear disadvantage of such systems is that the operator provides each consumer with a high quality (typically digital) master copy of the content. Under most circumstances, this is only a matter of providing high quality entertainment to the consumer. Unfortunately, however, for the unscrupulous consumer (e.g., pirate), this provides a means to generate illegal copies of content with little effort.

Of particular issue is the potential for unauthorized copying and widespread distribution of content, e.g., via a computer network such as the Internet. Traditional unauthorized dubbing and distribution of multiple copies of storage media, such as compact disc, digital video disc, or magnetic tape, is also a problem. In any case, it would be desirable to include information on a copy that is initially transmitted to a consumer that designates that specific copy as belonging to a particular recipient.

Letting the intended recipient know that this embedded information exists may help deter a potential pirate from making illegal use of the content. It will also allow enforcement agencies to track the source of many copies.

Even with this new found capability, the function must be economically practical. That is, a marking solution that costs more than the resultant savings from piracy is not practical. On the other hand, if a low cost solution is available, then security can be gained, and a substantial alleviation of the problem can be realized.

Accordingly, it would be desirable to provide a system for marking content in a very cost effective manner.

There are many techniques that have been proposed to embedded information into content. Each has advantages and disadvantages, but the common aspect of each is that some computation is required. Processing hardware must be adequate to perform the necessary computations quickly enough. If the hardware is not fast enough, e.g., in responding to a user's request to download data from a network, an undesirable latency in delivery time may result. Additionally, potential restrictions in overall throughput of the transmission system may result, thereby limiting the number of users that can download data at the same time or access the network. Moreover, it may not be possible or economically feasible for the legitimate on-line distributor to obtain faster hardware.

Accordingly, it would be desirable to provide a system which reduces the real-time computational requirements for embedding copy protect data into digital or analog content (e.g., audio, video, computer games, information services such a stock prices and weather data, on-line shopping or e-commerce data, etc.).

It would be desirable to provide a system for pre-processing a select number of copies of the same content, and then dynamically choosing from these pre-processed copies in order to create a properly encoded composite signal which is suitable, e.g., for downloading by a user.

The system should provide the capability to distribute the pre-processed content to multiple users at the same time, where the encoded composite signal is generated at the user's location according to an ID value provided to the user.

It would be desirable to provide multiple layers of data embedding.

It would be desirable to provide binary or multi-level, non-binary data embedding.

It would be desirable to provide a technique for smoothly transitioning between two data streams.

It would be desirable to provide an on-line distribution scheme which reduces delivery delays and improves network transmission throughput.

It would be desirable to enable the content to be processed on an off-line basis, e.g., by an on-line distributor, using available hardware.

The system should be suitable for off-line distribution schemes as well, e.g., where the content is provided to the user in person, via mail, and the like. In this case, the content may be stored on a compact disc (CD), digital video disc (DVD), computer floppy disk or the like.

The present invention provides a system having the above and other advantages.

SUMMARY OF THE INVENTION

There are many applications that rely on the ability to transmit content (e.g., audio, video and/or other data). Increasingly, to protect the proprietary rights of copyright holders, including authors, performers, and others, it is necessary to mark such transmissions in a manner that identifies any specific copy as belonging to a specific recipient. Preferably, the marking is provided in some secure manner. The most viable marking solution embeds information into the content, thereby reducing the likelihood of alteration or removal of the marking information.

Marking is particularly important, for example, for music, video, or other digital or analog copyrighted materials that are downloaded over a computer network such as the Internet, a cable or satellite television network, or telephone network, for example. Typically, a user pays a fee to download the content, although the content may be provided free of charge, e.g., for samples or other promotional distributions of the content.

However, while the ability to download the content provides a convenience for most legitimate users, unauthorized persons, known as pirates, can illegally copy and distribute the content using a variety of techniques. This results in significant lost revenues for the content providers and on-line distributor.

In order to help track this illegal distribution, information identifying the recipient (e.g., account number, social security number, or other unique identifier) is embedded directly into the content.

The presence of the identifying information can be advertised to warn potential pirates, or can be provided without warning to help track the pirate surreptitiously.

The invention is particularly suitable for use with on-line music distribution systems, wherein users may access a distribution site, such as an Internet web site, via a computer network to purchase audio programs such as those commonly distributed at retail outlets on compact disc or magnetic tape. The invention is also suitable for use with video, images, or other content to which embedded information can be applied. For example, interactive cable television networks may allow a viewer to download digital audio or video content.

The use of the present invention by on-line music distributors is particularly relevant since piracy of recorded music has resulted in significant lost sales for the music industry.

For on-line music distribution and other applications, one has several options for embedding information.

For example, pre-embedded copies can be stored in sufficient quantities to keep up with download requirements. For downloaded audio data, such as popular songs, this could require that many uniquely identified copies be kept on a server at the cost of increased storage.

Alternatively, information can be embedded during the transaction, e.g., as described in commonly-assigned U.S. Pat. No. 5,687,191, entitled "Post Compression Hidden Data Transport", or U.S. Pat. No. 5,822,360, entitled "Method and Apparatus for Transporting Auxiliary Data in Audio Signals." The approach described in U.S. Pat. No. 5,822,360 relies on additional computational processing, but only required copies are processed, and additional server space (e.g., memory) is not needed.

Another option, disclosed herein, requires that two copies of the content be pre-processed. The copies may be stored on a server, in which case a unique copy is constructed from the two pre-processed copies and provided to a user, typically at the time a download is requested.

For example, two server disks may be used to store each pre-processed copy of the audio. The first disk contains all copies embedded with "0's" and the second includes all copies embedded with "1's". Each server is connected to a selector function which selects one of the servers for each segment of the content to construct a composite data signal that is delivered to the user.

Based on an account number or some other unique identifier to be embedded, the selector function chooses segments from each server on a segment-by-segment basis. The output of the selector function is the copy to be delivered to the consumer.

Alternatively, the two copies of the content may be distributed to one or more users, in which case the users are provided with an appropriate processing capability to construct the unique copy. Cryptographic safeguards may be employed to ensure that the user cannot access the two copies prior to embedding the identifying data. The copies may be distributed simultaneously to the multiple users, such as for Internet multicasting of a concert or other live event.

In accordance with an example embodiment of the present invention, a method for providing a composite data signal with successive logical values embedded therein includes the step of: pre-processing data segments to provide at least first corresponding pre-processed segments with embedded information representing a first logical value embedded therein, and second corresponding pre-processed segments with embedded information representing a second logical value that is different than the first logical value embedded therein. The first and second pre-processed segments are then optionally stored, e.g., at a server of an on-line distributor.

A control signal designating the successive logical values is provided, and in response to the control signal, particular ones of the corresponding first and second pre-processed segments are assembled to provide the composite data signal with the successive logical values embedded therein.

The first and second logical values may comprise binary bits (e.g., the first and second values may indicate zeroes and ones, respectively).

When the segments of the composite data signal include audio data, the embedded information in the composite data signal may be provided at a desired audibility level therein.

When the segments of the composite data signal include video data, the embedded information in the composite data signal may be provided at a desired visibility level therein.

The successive logical values may identify a source of the composite data signal, such as the on-line distributor.

Moreover, the control signal may be provided in response to a user request to retrieve the composite data signal, in which case the successive logical values can identify the user.

The successive logical values may be provided cryptographically, e.g., in a scrambled sequence to deter manipulation by pirates.

In the assembling step, the particular ones of the corresponding first and second pre-processed segments are time-multiplexed in response to the control signal to provide the composite data signal with the successive logical values embedded therein.

The composite data signal may be digital or analog.

Optionally, multiple layers of embedded information may be provided in the composite data signal In a further option, a transition between the assembled segments is smoothed according to a transition function.

Pre-smoothed transition data segments may also be provided in the composite data signal.

Binary or multi-level ($M \geq 2$) logical values may be provided in the composite data signal.

In a further example embodiment of the present invention, a method for embedding auxiliary information symbols in a host content signal may include producing a first reduced-scale signal corresponding to the host content embedded with a first logical value. A second reduced-scale signal may also be produced which corresponds to the host content embedded with a second logical value. A first set of segments from the first reduced-scale signal may be combined with a second set of segments from the second reduced-scale signal in a predefined manner to produce a composite embedded host content.

The predefined manner may identify an entity or a transaction.

The combining may occur at a user premises or at an intermediate location.

The composite embedded host content may be transmitted and subsequently received at a display device. The composite host content may comprise at least one of audio, video, text, or programming information.

In an additional example embodiment of the present invention, a method for embedding auxiliary information symbols in a host content signal may include producing a set of embedding parameters corresponding to the host content embedded with at least a first and second logical values and selecting a sequence of logical values to be embedded in accordance with a control signal. The host content signal may then be processed in accordance with the embedding parameters and the control signal to produce a composite embedded host content.

The processing may occur at a different time or location than the producing of the set of embedding parameters. Further, the processing may occur at more than one time or location.

In another example embodiment of a method for embedding auxiliary information symbols in a host content signal in accordance with the present invention, a set of parameters is produced which corresponds to the host content signal embedded with at least first and second logical values. The parameters and the host content signal are transmitted to and received at a receiver, where the received host content signal is processed in accordance with the parameters and a control signal to produce a composite embedded host content.

An additional reduced-scale signal may be produced and transmitted to the receiver.

The parameters may be produced in accordance with the value or quality of the host content. The parameters may be produced in accordance with at least one of a user of the content or an intended usage of the content.

The processing may occur at more than one time or location. The parameters may comprise instructions related to the processing. The parameters may also comprise information related to a watermark embedding algorithm.

In an alternate example embodiment in accordance with the present invention, a method for embedding auxiliary information symbols in a host content signal includes embedding at least a portion of the host content signal with a first logical value to produce a first embedded host content. A reduced-scale signal is produced which comprises information necessary to modify portions of the first embedded host content to contain a second logical value. Portions of the first embedded content are modified with the reduced scale signal in accordance with a control signal to produce a composite embedded host content.

The reduced-scale signal may comprise a gain value. Alternatively, the reduced-scale signal may comprise a gain value and a carrier signal.

In another example embodiment in accordance with the present invention, a method for embedding auxiliary information symbols in a host content signal comprises pre-processing at least a portion of the host content signal to produce a signal in a first pre-defined state. Portions of the signal in the first pre-defined state may be modified in accordance with a control signal to produce a composite embedded host content.

The pre-processing may be adapted to reduce the interference of the host content with embedded auxiliary information.

The first pre-defined state may be neutral with respect to the embedding of different logical values.

Apparatus and data signals corresponding to the methods described above are also provided in accordance with the present invention.

BRIEF DESCRIPTION OF THE DRAWINGS

The present invention will hereinafter be described in conjunction with the appended drawing figures, wherein like reference numerals denote like elements, and.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention provides a method and apparatus for embedding information into content in a manner that minimizes the computational requirements at the time of embedding. The content in this case is any form, or combination, of digital or analog audio, video, images, text, programming information, or other media or information.

This invention allows for pre-processing to be performed prior to the final processing such that an on-the-fly (e.g., real-time) embedding can be performed by choosing from specifically prepared segments and assembling a full stream. The invention is particularly suitable for an on-line distribution model, where the content is delivered via a communication channel in response to a user request.

Figure 1:
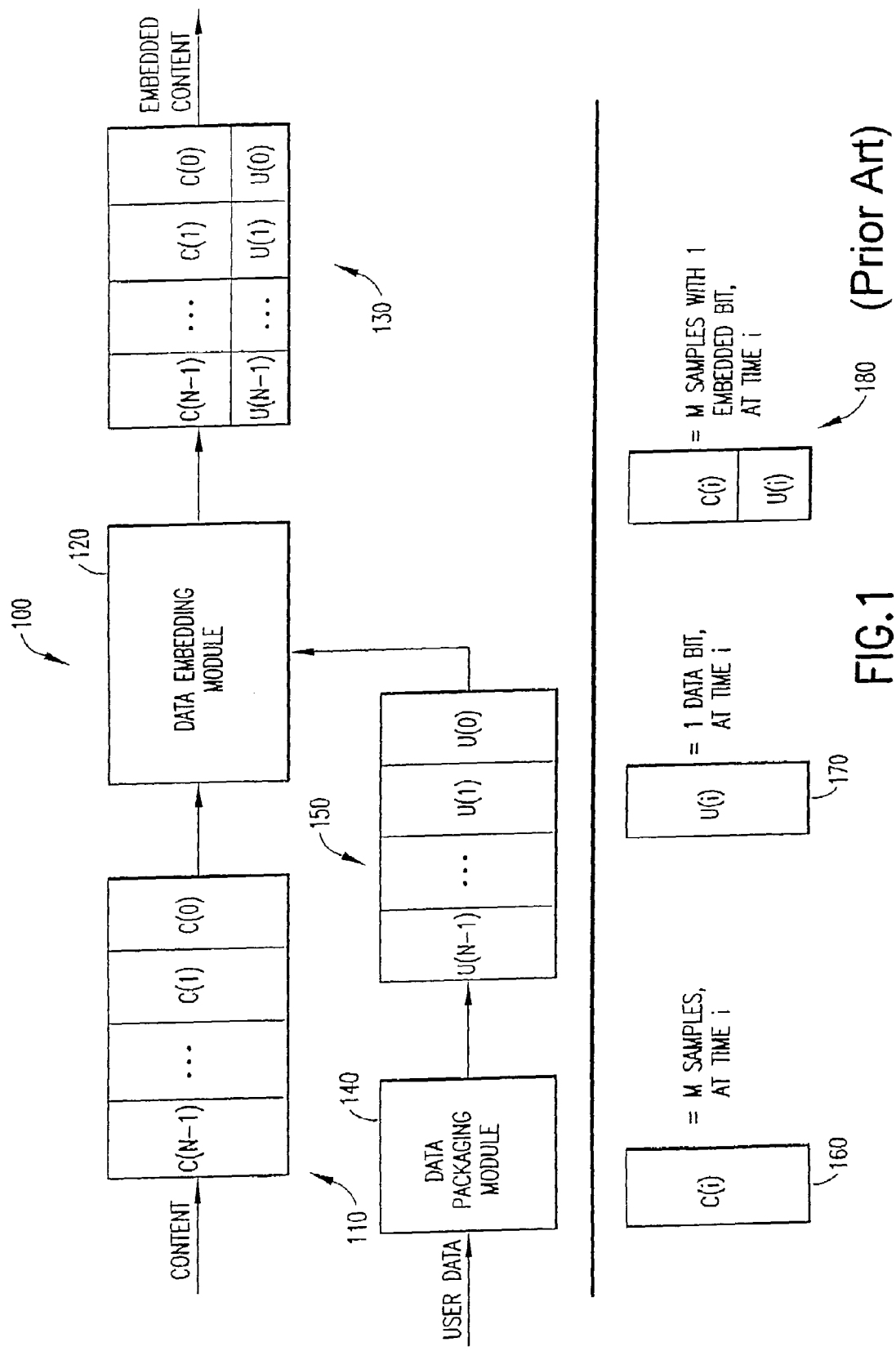
FIG. 1 illustrates an example of a conventional data embedding system.

FIG. 1 illustrates a conventional data embedding system 100. The content where the data is to be embedded is assumed to be segmented into N frames, with M samples per frame. For example, the content is shown at 110 with frames C(N−1), . . . , C(1), C(0). User data, e.g., which identifies the user, is processed by a data packaging module 140, which converts the data into binary user data, shown generally at 150 with frames U(N−1), . . . , U(1), U(0). The module 140 can optionally add error correction code, modulation and packet header/trailers to the user data.

A data embedding module 120 aligns the packaged data (as indicated by U(0), U(1) etc. . . . ) with the respective content frame (C(0), C(1) etc. . . . ), and embeds the ith packaged data bits U(i) 170 into a corresponding ith content frame C(i) 160 to provide an ith embedded data frame 180. Successive frames of embedded content are shown at 130. The embedding process may employ any known technique, including additive techniques such as spread spectrum modulation, as well as techniques that modify the signal parameters or the features of the content itself.

The data packaging module 140 usually uses relatively little processing cycles compared with the data embedding module 120.

Figure 2:
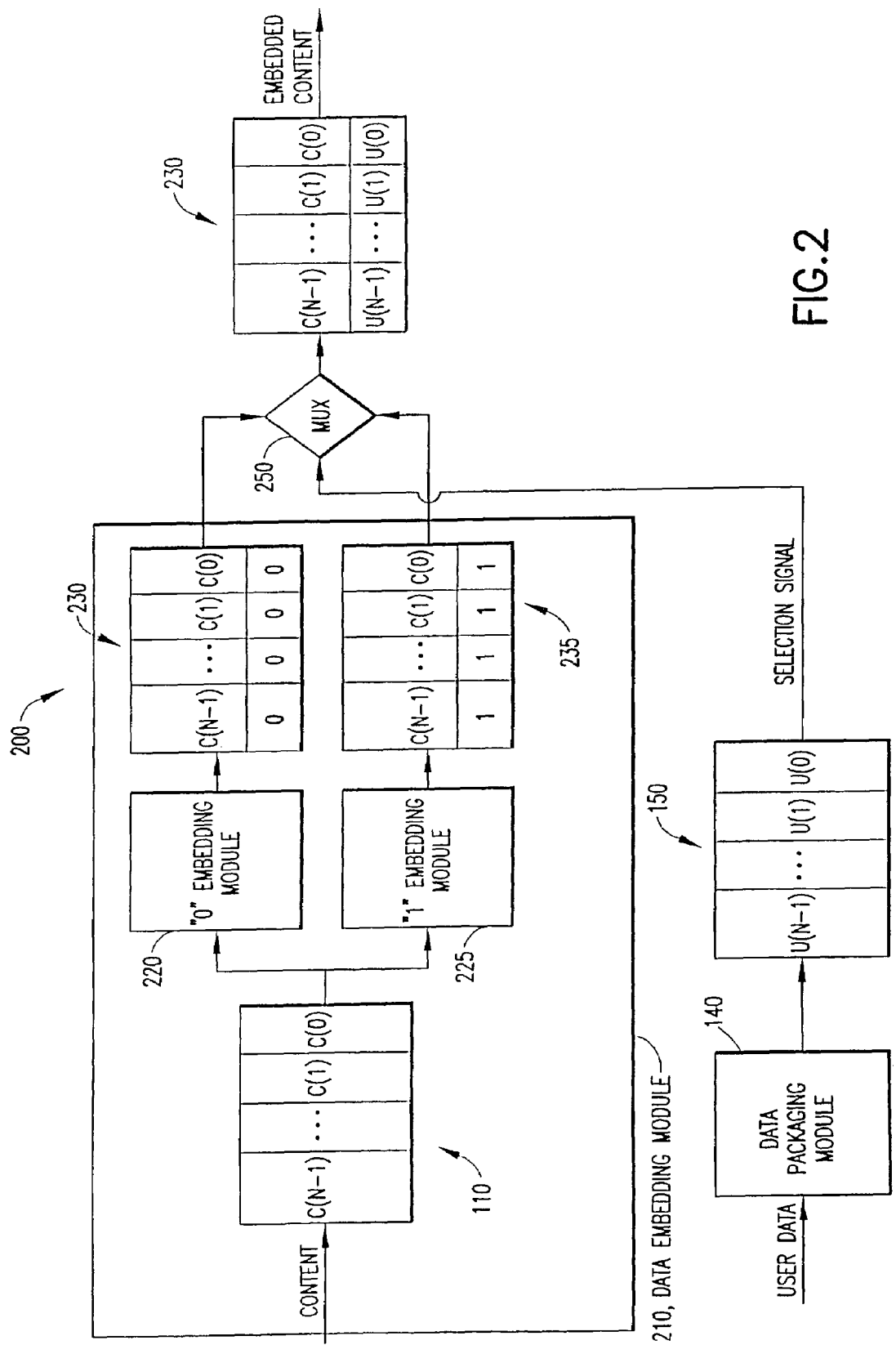
FIG. 2 illustrates an example first embodiment of a data embedding system in accordance with the present invention.

FIG. 2 illustrates a first embodiment of a data embedding system 200 in accordance with the present invention.

The pre-processed data embedding system of the present invention partitions the conventional system into two steps, namely (1) pre-processed embedding, and (2) target content generation.

The data embedding module 210 receives the content stream 110 and has two output paths, one to generate a content stream 230 that embeds a binary '0', and one to generate a content stream 235 that embeds a binary '1'. The two pre-processed content streams can be multiplexed (in digital or analog domain) at a mux 250 into the respective target embedded stream 230 according to the binary user data itself, or a corresponding control signal from the data packaging module 140. If U(i) is a non-binary value, then the preprocessing stage can be increased accordingly by having more than two output paths.

This enables the generation of multiple, uniquely identified content streams with minimal processing power (by the addition of more data packaging modules), which makes the encoder 200 ideal, e.g., for use in transactional watermarking or internet multicast applications.

Figure 3:
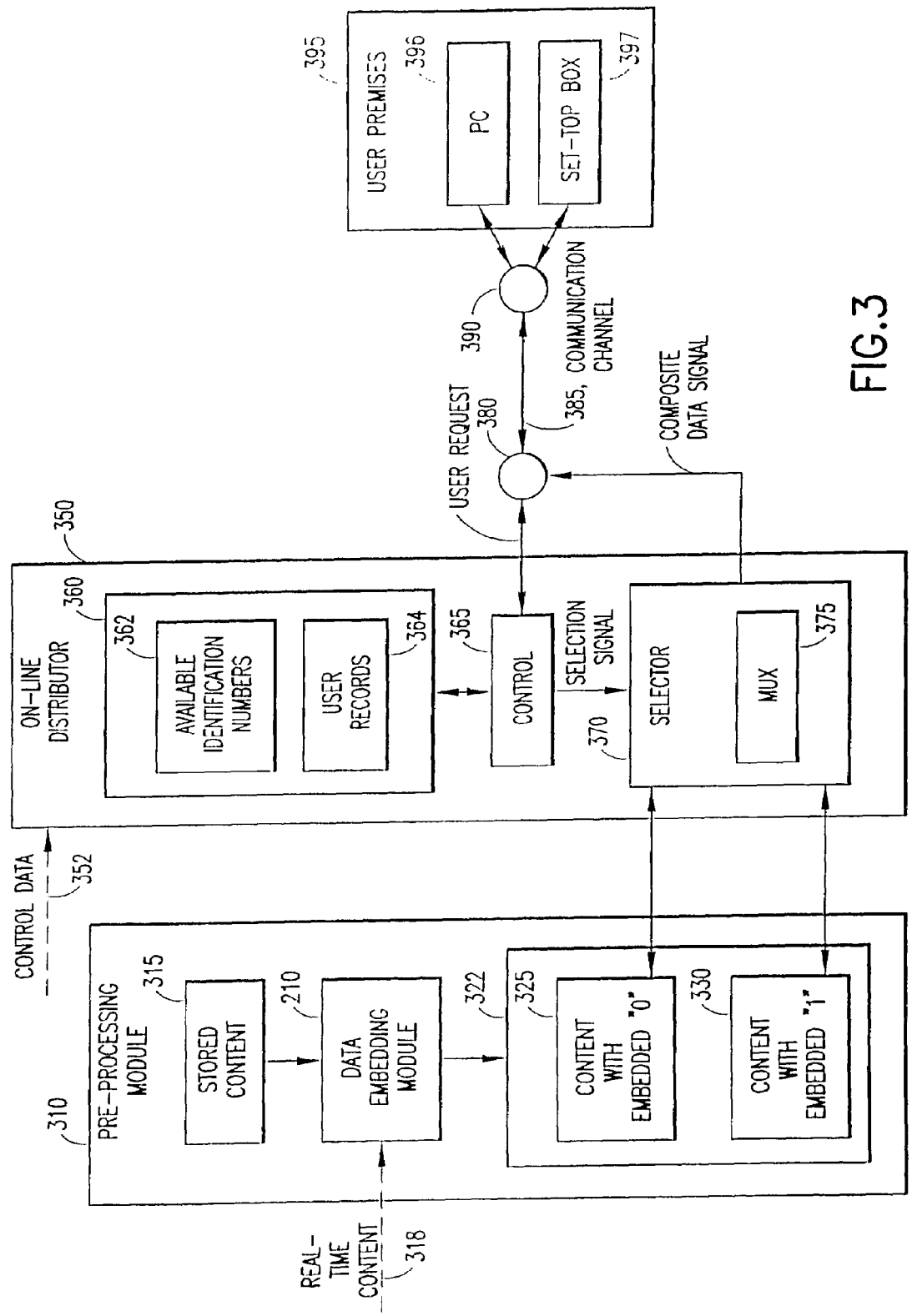
FIG. 3 illustrates an example embodiment of a pre-processing module and on-line distribution system for distributing digital or analog content in accordance with the present invention.

FIG. 3 illustrates a pre-processing module and on-line distribution system for distributing content in accordance with the present invention. In this example, it is assumed that a user communicates with an on-line distributor 350, e.g., via a two-way Internet connection, including a communication channel 385 and nodes 380 and 390. The on-line distributor 350 also communicates with a pre-processing module 310, which is typically physically co-located with the on-line distributor 350, but may be in communication with the on-line distributor via some communication path.

The pre-processing module 310 can operate on an off-line basis, e.g., prior to when the on-line distributor fulfills an order from the user to download digital content. Optionally, the pre-processing module 310 can operate on a real-time basis, such as when a live event is received via a communication path 318, and immediately processed for multicast to a user population.

Generally, any new content stored in the content function 315 can be processed immediately upon receipt, or at some other convenient time. The content (also referred to as "primary data" or "host waveform") is provided to the data embedding module 210 to have logical values (e.g., binary zeroes and ones) embedded therein. The content can be divided temporally into a number of segments, and a logical value embedded into each segment, as discussed further in connection with FIG. 4.

The data embedding module 210 can use any known technique for embedding data into an existing signal. For example, the techniques of the following U.S. patents, incorporated herein by reference, may be used: U.S. Pat. No. 5,822,360, entitled "Method and Apparatus for Transporting Auxiliary Data in Audio Signals"; U.S. Pat. No. 5,937,000 entitled "Method and Apparatus for Embedding Auxiliary Data in a Primary Data Signal"; U.S. Pat. No. 5,687,191, entitled "Post Compression Hidden Data Transport"; U.S. Pat. No. 5,901,178 entitled "Post Compression Hidden Data Transport for Video"; U.S. Pat. No. 5,719,937, entitled "Multi-Media Copy Management System"; U.S. Pat. No. 5,963,909, entitled "Multi-Media Copy Management System", and U.S. Pat. No. 6,792,542, entitled "Digital System for Embedding A Pseudo-Randomly Modulated Auxiliary Data Sequence in Digital Samples".

Generally, the term "embedding" is meant to indicate that ancillary, or auxiliary data, is provided in a host waveform, or primary data signal, without substantially interfering with the primary data signal. For example, embedded data should not be audible when embedded in an audio signal. Typically, the data rate of the embedded data is much lower than that of the primary data signal.

For example, U.S. Pat. No. 5,822,360 discloses a technique for embedding data by modulating a spread spectrum signal. The spread spectrum signal has a relatively low noise power, but can be recovered at a special decoder by correlating the received signal with the pseudo-noise (PN) sequence used for spreading at the encoder.

Techniques for embedding data often require computationally intensive time-domain or frequency domain analyses that take advantage of human hearing and vision characteristics, e.g., to allow data to be embedded in audio and video data, respectively. The embedded data can therefore be made essentially imperceptible, while establishing a useful hidden data channel within the primary data signal.

With the present invention, the sophisticated, computationally intensive embedding techniques may take place in a pre-processing step, prior to the time when the content must be immediately available for delivery to users. The logical values can be thus be embedded using the most sophisticated techniques available, yet the content is immediately available for downloading or broadcasting to users. In a memory 322, the content segments with the embedded binary zeros are stored in memory portion 325, while the content segments with the embedded binary ones are stored in memory portion 330. It should be appreciated that if more than two logical values are embedded, memory portions can be provided for each value. Moreover, in practice, a library of content, e.g., including songs, movies, computer games, and the like, may be stored at the functions 325 and 330.

The memory 322 may be associated with a web server, for example.

For transmission of live events, or when it is desired to pass-through content that is received (via path 318) at the pre-processing module 310 to the user without delay, the memory 322 may only act as a buffer, e.g., to even out data rate variations and account for processing time at the data embedding module 210.

The on-line distributor 350 may maintain a database 360, including available identification numbers 362, and user records 364. The available identification numbers may simply be successive numbers, or other codes. In practice, the available identification numbers function 362 may maintain only a current order (or user) number, which is then incremented for each new order (or user). The user records function 364 maintains a record of the identification number that is associated with each user or order. The term "order" is meant to encompass users request for free samples, promotional giveaways, contests and the like, as well as paid purchases of content.

When a user request is received at a control 365, or control data is received via a communication path 352 (which may be the same or different than path 318), an identification number or code is associated with the user or order, and a record thereof is written at the user record function 364. Consequently, when content that has been illicitly copied is found, it will be possible to locate the user that originally obtained the content.

The identification number or code may also identify the on-line distributor or other entity, such as a copyright holder of the content, or may provide a registration number for an industry policing organization, for example.

Moreover, while copy protection is a primary goal of the invention, it will be appreciated that the embedded data may be used for essentially any purpose, in particular, if the user has a receiver that can read the data. For example, the embedded data may identify the on-line distributor or other entity, be used for awarding prizes to users, providing electronic coupons, and so forth. A corresponding receiver can read the embedded data and, e.g., display the corresponding information for the user.

At the user's premises 395 or other location, the user may order and/or receive the content using a personal computer (PC) 396, television set-top box 397, or any other available means.

In response to a user request or control data via path 352, the control 365 provides the identification number or code to a selector 370 as a selection signal to select the different segments with the embedded logical values from the functions 325 and 330 on a time-multiplexing basis, e.g., using a multiplexer (MUX) 375. The selector acts as a switch that allows successive segments from either the function 325 or 330, but not both at the same time, to be delivered to the user, as a composite data signal.

The term "successive" is used herein is understood to include both adjacent and non-adjacent segments which follow one another.

The selection signal generally can be a binary identification signal, or a signal derived from the identification signal. Cryptographic techniques may be used for this purpose (e.g., to transform the identification signal to a selection signal, or vice versa).

At the user premises, an appropriate capability is provided to decrypt the received data.

The control 365 may also make a record indicating that the content was delivered without errors if a bi-directional capability is provided. The time and date of the delivery may also be recorded, e.g., at the user records 364. The information embedded in the composite data signal may also indicate the time and date of the delivery.

The delivered content is provided to the user for storage, e.g., at the PC 396 or set-top box 397. The same or different communication channels can be used for the upstream request signal and the downstream delivery. As an example of using different channels, the upstream request may be provided via a telephone network, while the downstream delivery is provided via a television network.

If sufficient bandwidth is available, the content may be delivered to multiple users at the same time using separate signals with the unique identification numbers embedded therein. When bandwidth is limited, and the number of users is large, such as for a multicast, the system of FIG. 6, discussed below, may be used.

Figure 4:
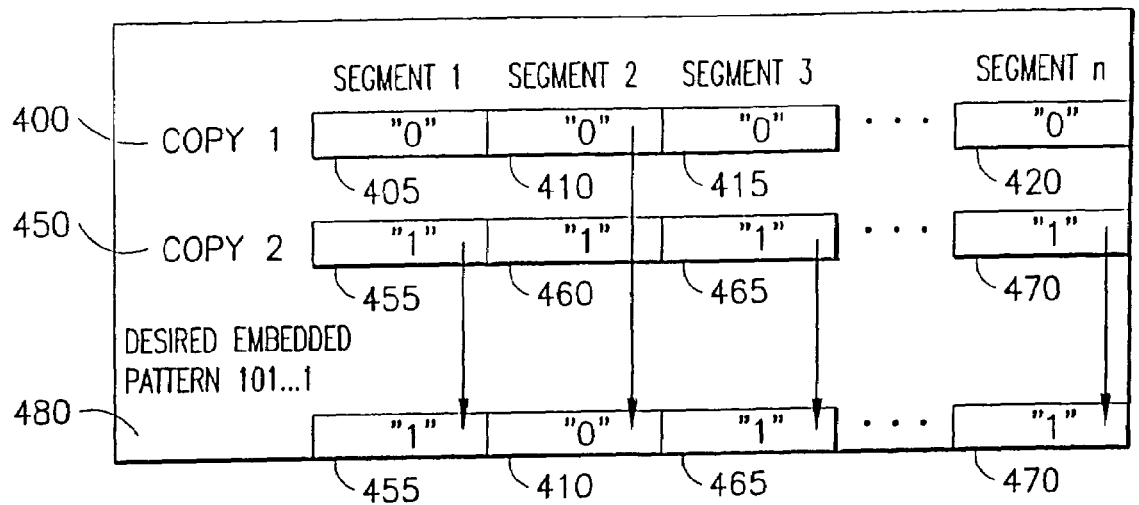
FIG. 4 illustrates an example of the selection of data segments with embedded binary data in accordance with the present invention.

FIG. 4 illustrates the selection of data segments with embedded binary data in accordance with the present invention. A first copy 400 of content includes successive segments, e.g., SEGMENT 1 (405), SEGMENT 2 (410), SEGMENT 3 (415), . . . , SEGMENT N (420). Each segment has a logical value, which is a binary zero in the present example, embedded therein. Not every segment need have a value embedded into it. In fact, a further security element may be achieved with the present invention by selecting only particular segments to embed data, e.g., according to a pseudo-random signal, such as a PN sequence. Moreover, the embedded values may be provided in a scrambled order according to any known cryptographic technique to discourage manipulation of the data by an attacker. The corresponding information must be provided to a decoder to reverse the scrambling or encryption.

A second copy 450 of the same content includes successive segments corresponding to the first copy 400, e.g., segment 1 (455), segment 2 (460), segment 3 (465), . . . , segment N (470). Each segment has a logical value, which is a binary one in the present example, embedded therein.

For example, if the content is an audio track, each segment may comprise a specific duration of the track, e.g., corresponding to one or more frames of data.

A composite data signal 480 is formed by selecting segments from the first and second copies according to a desired embedded bit pattern. For example, if the desired embedded bit pattern is 101 . . . 1, then segment 1 (455) from copy 2 (450) should be selected, followed by segment 2 (410) from copy 1 (400), followed by segment 3 (465) from copy 2 (450), . . . , followed by segment N (470) from copy 2 (450). The composite data signal 480 therefore has the desired bit pattern 101 . . . 1 embedded therein.

A final, composite copy is thus constructed by selecting previously-created segments from either the first or second copies of the audio data with the embedded binary information.

As mentioned, the binary data sequence may identify a user who is downloading the content via a network, or provide other information. In this case, the composite data signal may be assembled in response to the user's purchase of the content.

The overall effect is that the consumer does not know the state of the information embedded into the composite data signal since the final copy received is perceptually identical to the same content from another copy that does not have embedded data. For audio data, this result is achieved by providing the embedded data at a power level such that it is inaudible when the audio data is recovered and played. The embedded data may also be spectrally shaped according to the audio spectrum to further enhance concealment.

For video data, the embedded data may be provided at a power level such that it is not visible when the video data is recovered and displayed.

Figure 5:
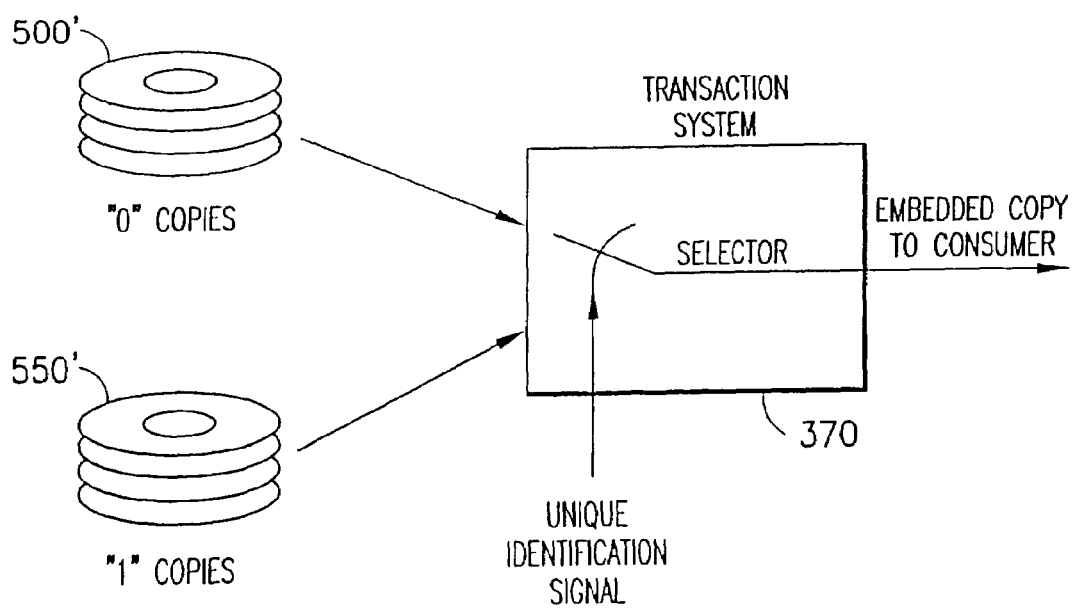
FIG. 5 illustrates an example of the selection of content according to an identification signal in accordance with the present invention.

FIG. 5 illustrates the selection of content according to an identification signal in accordance with the present invention. The copies of content with binary zeroes and ones embedded therein are shown generally at 500' and 550', respectively. A transaction system includes a selector 500 which selects segments from the copies according to a unique identification signal, as discussed previously in connection with the selector 370 of FIG. 3.

The composite data signal may comprise audio, video (moving or still images), computer games, or other content. The advantage of using a binary signal is that only two logical values exist, so only two copies of the content need be stored.

If an M-ary signaling scheme is used, such as M-level pulse amplitude modulation (PAM), M copies of the content with embedded data are prepared.

A constant data rate can be used for the embedded information. This provides for a more universal description, but is not a specific limitation on the system. Using this convention allows a binary digit to be applied to a specific section (e.g., segment) of audio or other content, namely in the form of a specific number of audio samples for each segment.

For example, digital audio found on compact discs (CDs) operates at a rate of 44,100 samples per second. In this case, for example, 1,000 samples per segment of audio may be used for each binary digit of the embedded information. That is, one bit of embedded information is distributed over 1,000 audio samples. Each segment, such as discussed in connection with FIG. 4, will therefore comprise at least 1,000 samples. This means that a copy of the desired audio can convey approximately 44 bits of embedded (e.g., auxiliary) information per second.

The first and second copies of the audio data are encoded with a "0" or "1", respectively, in every 1,000 sample segment. Otherwise, the copies have identical audio content. That is, the same audio data is provided in the corresponding segments.

Figure 6:
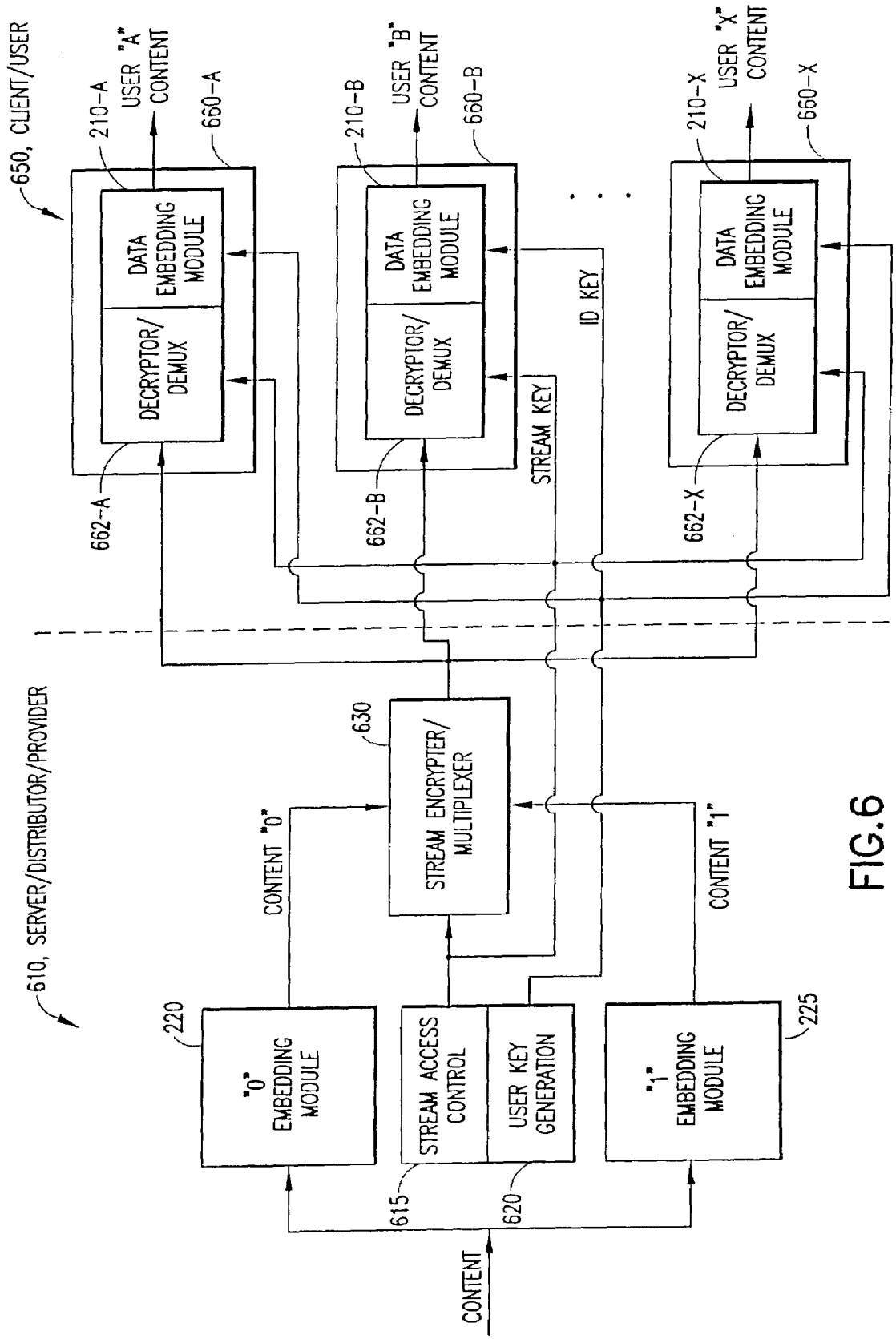
FIG. 6 illustrates a second example embodiment of a data embedding system in accordance with the present invention.

FIG. 6 illustrates a second embodiment of a data embedding system in accordance with the present invention. This embodiment is particularly suitable for multicast transmissions to a user population, e.g., for a live event.

Here, the preprocessors (e.g., "0" embedding module 220, and "1" embedding module 225) reside on the content server/distributor/provider side 610, while the transaction system (e.g., data embedding module) resides on a client/user side 650. The "0" and the "1" streams from the modules 220 and 225, respectively, are "packaged" by a Stream encryptor/multiplexer unit 630 into a single stream, which is delivered to a number of user terminals 660-A, 660-B, . . . , 660-X. Alternatively, the "0" and the "1" streams may be provided to the user terminals in separate data streams.

For example, the terminals may be set-top boxes (e.g., decoders) or personal computers coupled to a cable television network, and receive the content with television or other signals.

The content with the embedded logical values is encrypted at the function 630 according to a stream key provided by a stream access control function 615. The use of cryptographic keys is believed to be within the purview of the ordinary practitioner and is therefore not discussed in extensive detail herein.

Only the properly authorized user can obtain a stream key from the stream access control unit 615 to restore the two streams at the respective decryptor/demultiplexer 662-A, 662-B, . . . , 662-X. In addition, the users will also receive an identification (ID) value from a user key generation unit 620. At the respective data embedding modules 210-A, 210-B, . . . , 210-X, the ID will be embedded into the content, as discussed in connection with FIGS. 2-5. Both the stream key and the ID value can be provided at the terminals 660-A, 660-B, . . . , 660-X various means, e.g., by installation at the time of manufacture of the terminals, local installation at the terminal such as by using smart card (with periodic renewal), or by secured transmission to the terminals (using the same or different communication path as the multicast content).

The ID value is embedded real-time at the data embedding modules 210-A, 210-B, . . . , 210-X on the user's side to generate the user-specific content. To deter piracy, various mechanisms can be used to ensure the tightly coupled structure of the decryptor/Demux and the data embedding modules so that the "1" and the "0" streams, as well as the ID value, are not accessible in the clear on the client/user side 650. For example, the "1" and the "0" streams can be swapped pseudo-randomly at frame boundaries. Additionally, the ID value can be scrambled in advance in a corresponding manner so that the correct ID value is encoded at the data embedding modules without revealing the ID value itself. This ensures the security of the streams themselves during storage or distribution, and, at the same time, the ID value is secure even after decryption.

This implementation is particularly suitable for applications where the content provider wants to minimize distribution channel bandwidth utilization, e.g., during the distribution of the content using pay-per-listen or pay-per-view in a cable network. The cable operator needs only to allocate the bandwidth for the "1" and "0" streams. The users' terminals 660-A, 660-B, . . . , 660-X, will generate content which is uniquely marked by the corresponding data embedding module 210-A, 210-B, . . . , 210-X. This helps to deter the users from illegally copying and redistributing the content.

In a further refinement, bandwidth need not be allocated for the two streams at all times. For example, the distributor can choose a particular segment of the content, and transmit both the "0" and "1" streams to the users, and during other times, transmit only the "0" or "1" streams, or even the unmarked content.

Figure 7A:
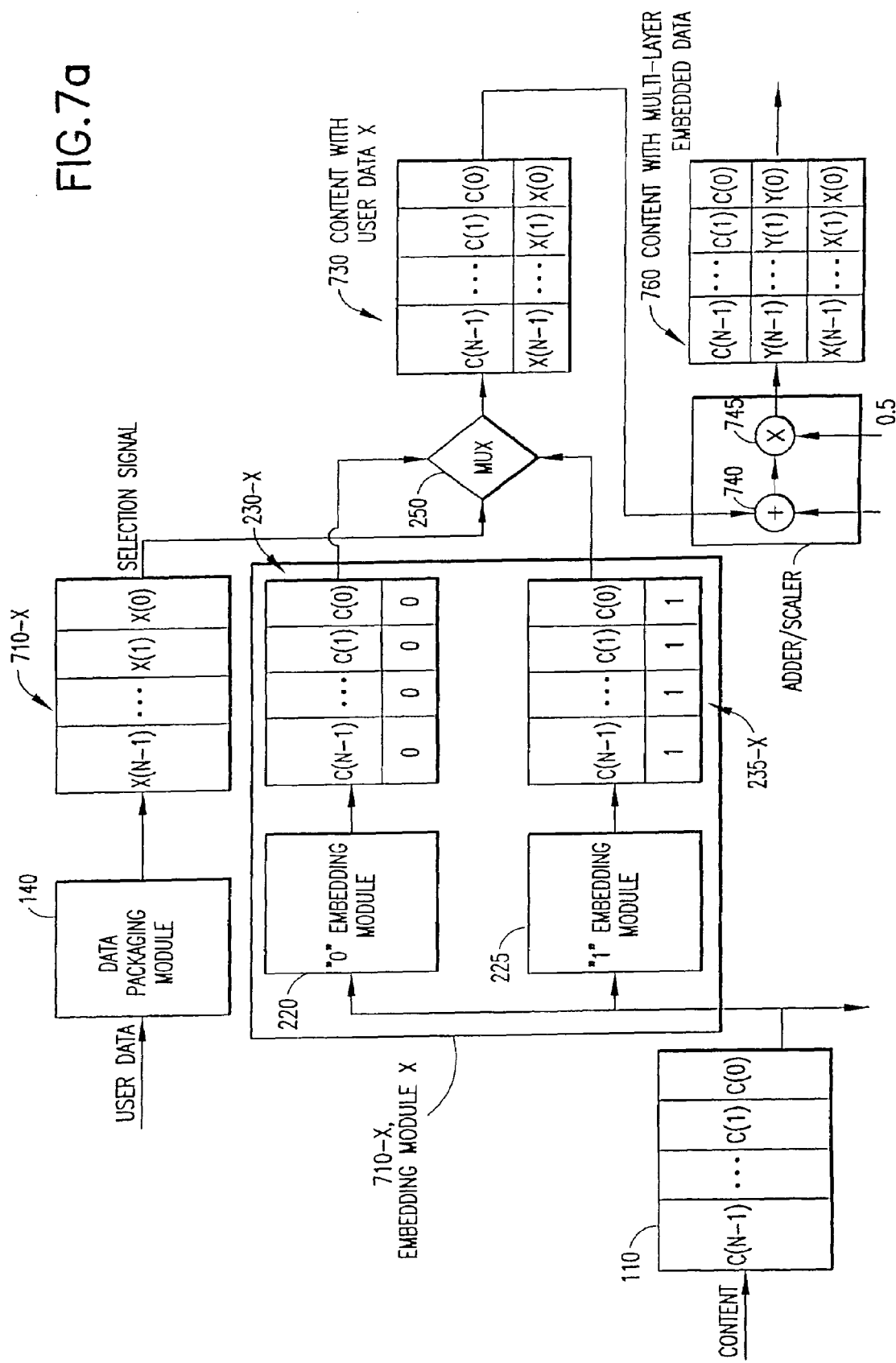
FIGS. 7(a) and 7(b) illustrate an example of multiple layer data embedding in accordance with the present invention.
Figure 7B:
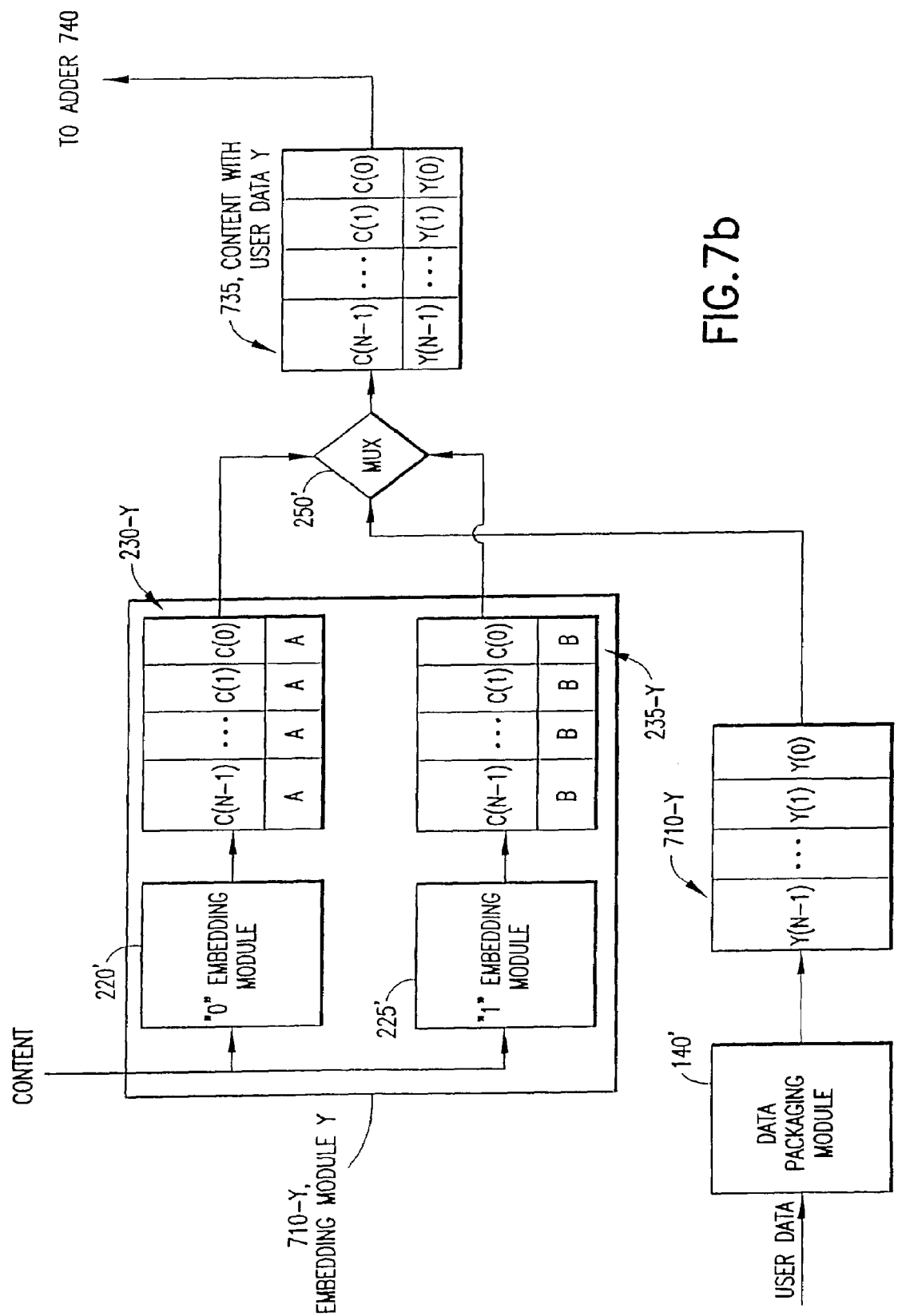

FIGS. 7(a) and 7(b) illustrate multiple layer data embedding in accordance with the present invention. Multiple, independent streams of data, referred to as data layers, can be embedded in the same content. The present invention can be adapted for use with multi-layer embedding schemes, such as disclosed in the aforementioned U.S. Pat. No. 5,822,360. Note that the embedding of the different user data (User Data X and Y) can use either identical or dissimilar data embedding technology, although there are advantages to using identical technology, such as ease of frame synchronization.

Applications of multi-layer data include providing separate user data streams for tracking, hyperlinks, or electronic coupons, for example.

As shown in FIG. 7(a), a first stream of user data, e.g., User Data X, is processed by the data packaging module 140 to provide the corresponding binary user data, shown generally at 710-X with frames X(N−1), . . . , X(1), X(0).

At the embedding module 710-X, the "0" embedding module 220 and "1" embedding module 225 are used as discussed previously to provide the target streams 230-X and 235-X, respectively. The streams 230-X, 235-X are provided to a mux 250 to obtain the content stream 730 with the user data X embedded therein.

Similarly, as shown in FIG. 7(b), a second stream of user data, e.g., User Data Y, is processed by the data packaging module 140' to provide the corresponding binary user data, shown generally at 710-Y with frames Y(N−1), . . . , Y(1), Y(0).

At the embedding module 710-Y, the "0" embedding module 220' and "1" embedding module 225' are used as discussed previously to provide the target streams 230-Y and 235-Y, respectively. The streams 230-Y, 235-Y are provided to a mux 250' to obtain the content stream 735 with the user data Y embedded therein.

Referring again to FIG. 7(a), the streams 730, 735 are combined at an adder 740 and scaled at a scaler 745 to provide the data stream 760 with multilayer embedded data. For example, a scaling factor of 0.5 may be used when there are two content streams with different user data. The scaler 745 essentially provides the amplitude of the content and user data in the stream 760 at the same level as in the streams 730, 735.

Note that more than two layers of embedded user data may be used, in which case the scaler 745 is adjusted according to the number of layers used.

Figure 8B:
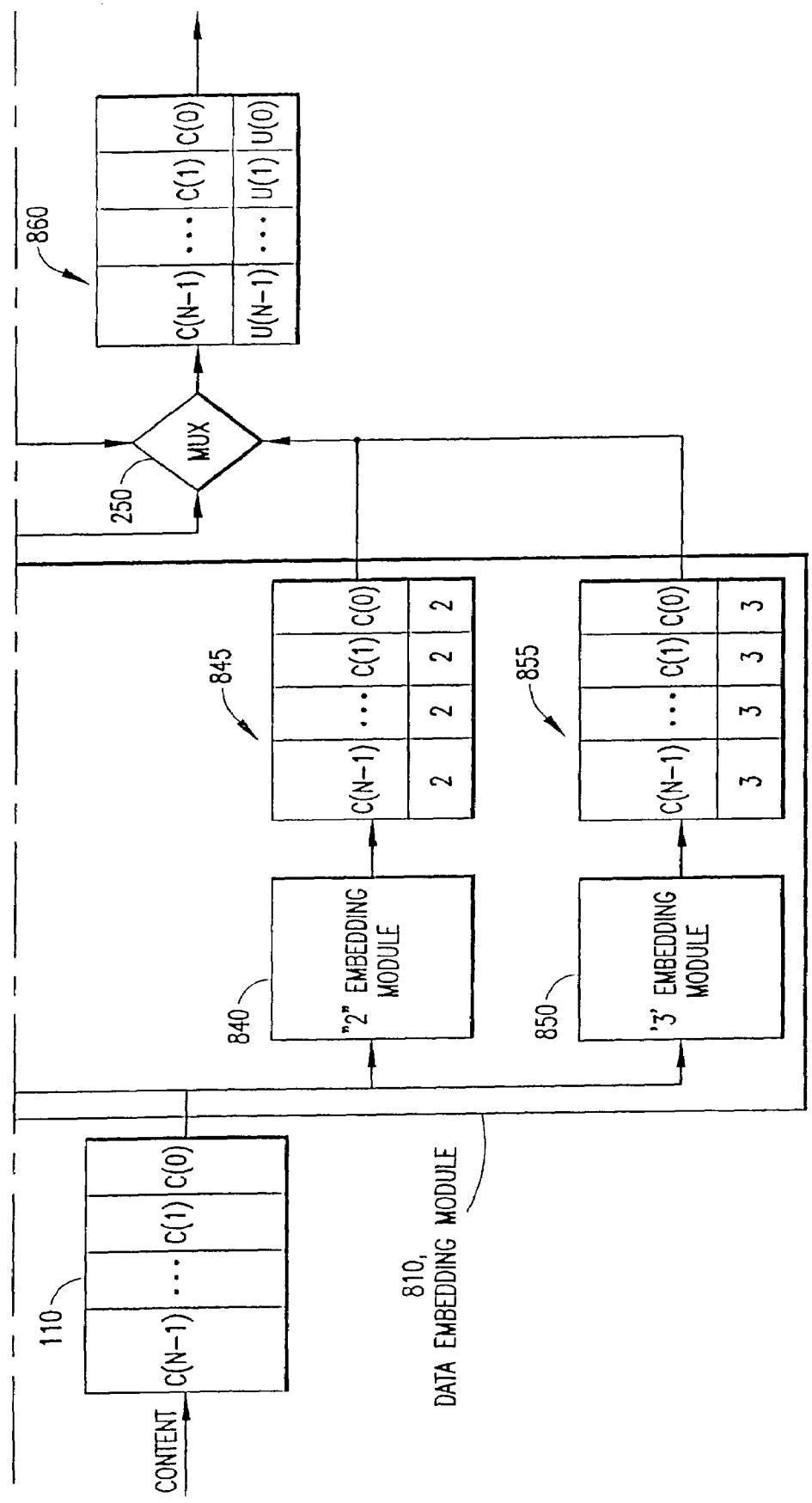
FIG. 8 illustrates an example of multi-level, non-binary data embedding in accordance with the present invention.

FIG. 8 illustrates multi-level, non-binary data embedding in accordance with the present invention. The system can be extended to the embedding of multi-level (non-binary) value data. With M levels, the system is termed M-ary, with $M \geq 2$. For illustration purpose, a system with data of four (M=4) distinct logical value (0,1,2,3) is presented. It should be appreciated that all multi-level variations can be realized as a parallel combination of binary data embedding.

An M=4 level data embedding module 810 includes a "0" embedding module 220 for embedding logical "zero" values, a "1" embedding module 225 for embedding logical "one" values, a "2" embedding module 840 for embedding logical "two" values, and a "3" embedding module 850 for embedding logical "three" values, to provide the respective data streams 830, 835, 845 and 855. The data streams 830, 835, 845 and 855 are provided to a mux 250 to provide the content data stream 860 with the multi-level user data embedded therein. As discussed previously, the mux 250 outputs successive frames of data with the desired logical values embedded therein, e.g., under the control of the user data stream 150.

Figure 9:
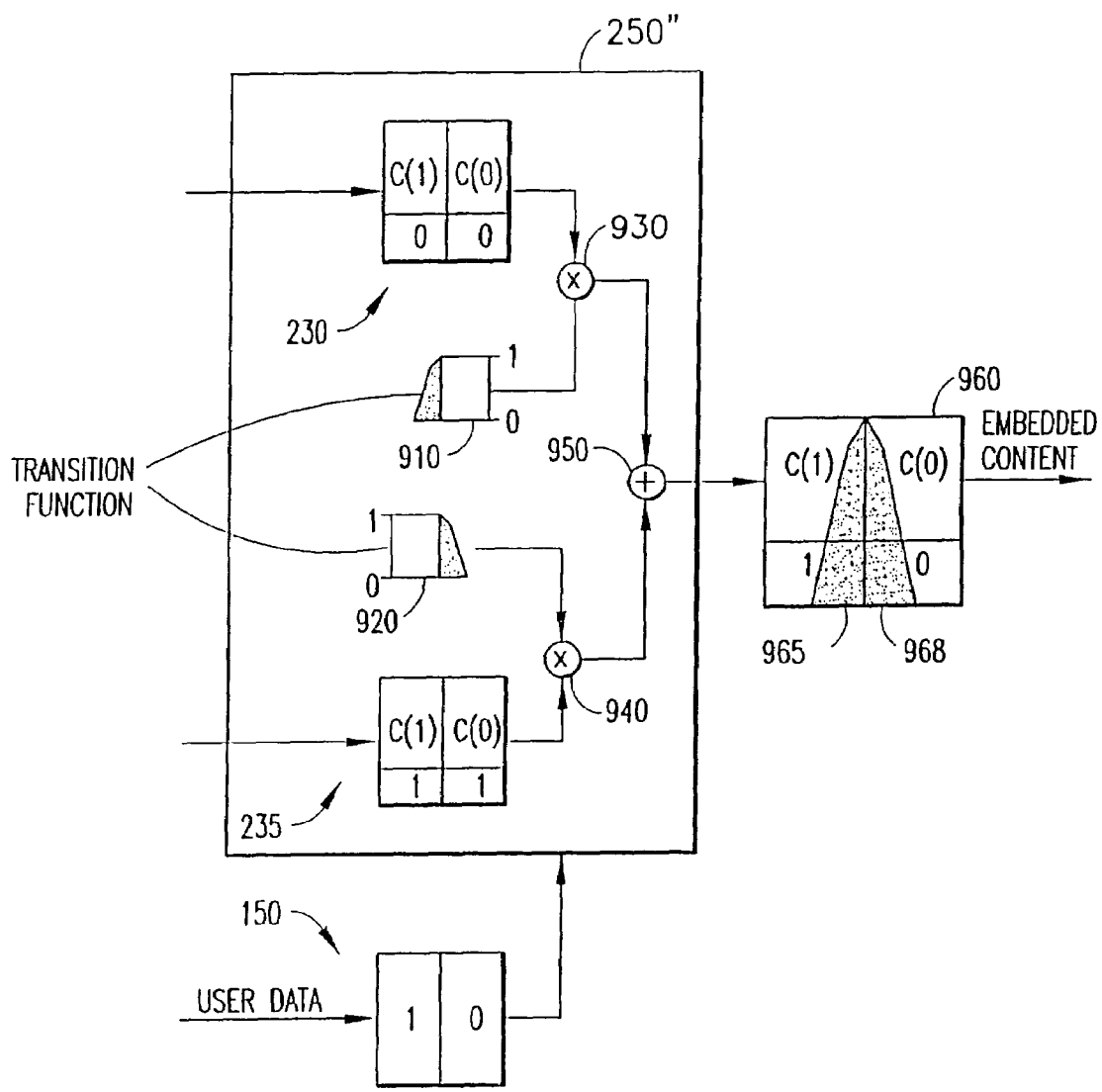
FIG. 9 illustrates an example embodiment of a multiplexer with a transition function in accordance with the present invention.

FIG. 9 illustrates a multiplexer with a transition/fade function in accordance with the present invention. To ensure a smooth transition at the frame boundary, an explicit window/fade-in/fade-out may be performed at the multiplexer 250". The multiplexer 250" may be used, e.g., in place of the multiplexers 250 or 250' discussed herein.

When splicing (e.g., time-multiplexing) frames from different data streams, the content signal may not be continuous at the boundary between the frames. This can result in artifacts, e.g., audible artifacts for audio content, or visible artifacts for video content. A transition period can be provided as discussed herein, in connection with FIGS. 9 and 10, to avoid these effects.

The transition period is typically shorter than the frame length. For example, with a frame length of 2000 samples, the transition length may be 100-200 samples.

The transition function can be a fixed function, such as a linear ramp or an exponential decay, or an adaptive function that dynamically adjusts its characteristics based on the host signals. The objective is to ensure that the transition does not produce any artifacts which affect the subjective quality of the target content.

The target embedded streams 230 and 235, with the embedded logical zero and one values, respectively, are multiplied at multipliers 930 and 940 with transition functions 910 and 920, respectively. The transition function 910 is shown ramping (in two steps) from zero to one. When the transition function 910 reaches one, the transition function 920 begins ramping down (in two steps) from one to zero. The outputs of the multipliers 930 and 940 are combined at an adder 950 to provide the embedded content 960.

The embedded content 960 is shown including a first frame C(1) and a second frame C(0). The effect of the transition function 910, 920 transition region is shown diagramatically at regions 965, 968, respectively.

Figure 10B:
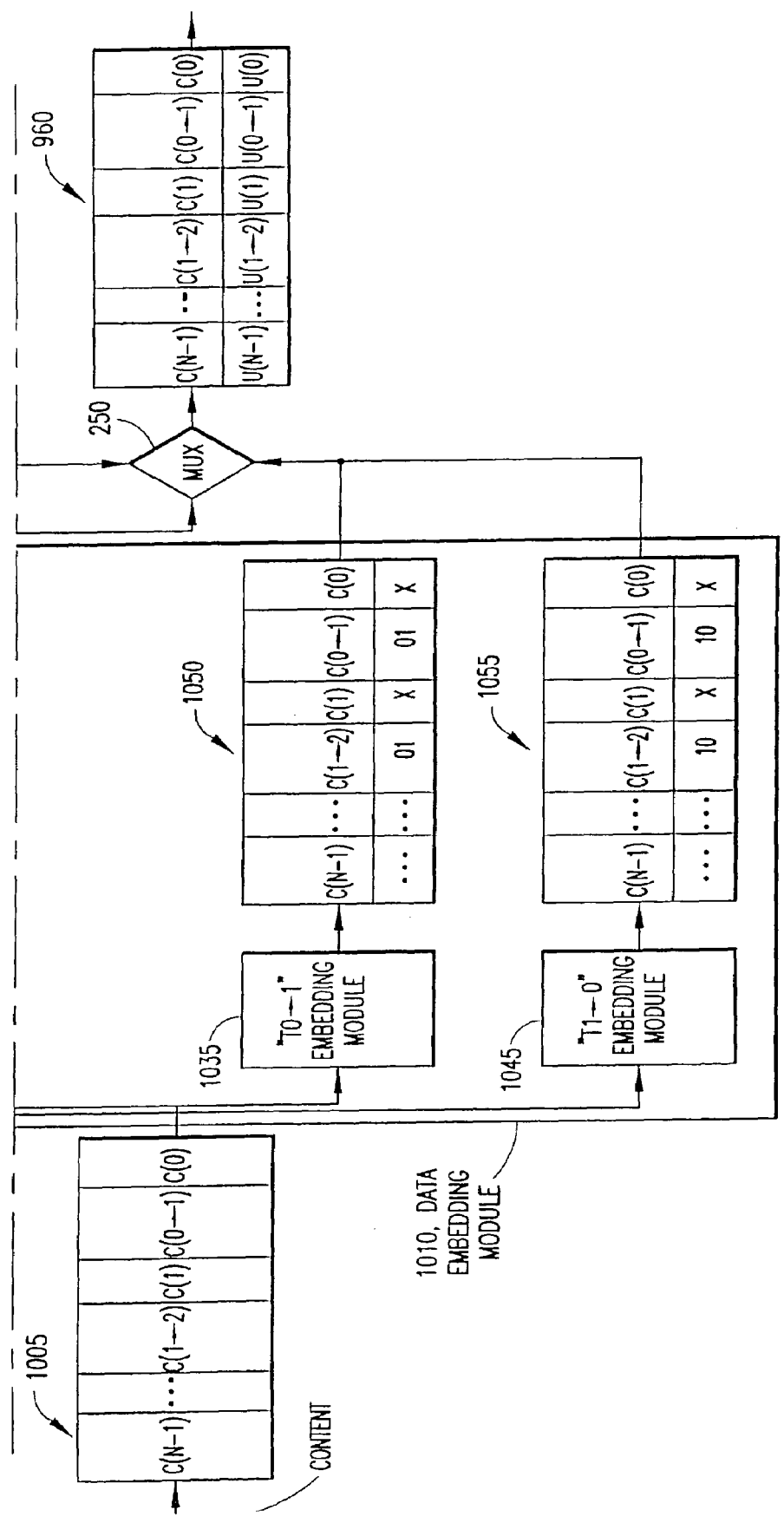
FIG. 10 illustrates an example embodiment of a system for transition control between two streams in accordance with the present invention.

FIG. 10 illustrates a system for transition control between two streams in accordance with the present invention. Another approach to ensuring a smooth transition at frame boundaries is to provide additional transition streams. This avoids the need for the mux 250" of FIG. 9 by providing data streams that are pre-processed (e.g., pre-smoothed) with a transition function, such as the function 910, 920 of FIG. 9.

Then, to assemble the final target stream, the pre-processed frames can be time multiplexed as discussed previously, e.g., using the mux 250 or 250'.

Here, user data frames U(N−1), . . . , U(1→2), U(1), U(0→1), U(0) are provided. U(1→2) denotes a transition frame between frames U(1) and U(2), while U(0→1) denotes a transition frame between frames U(0) and U(1).

The "0" data embedding module 220 provides the content frames 1030 with embedded logical "zero" values 1030, while the "1" data embedding module 225 provides the content frames 1035 with embedded logical "one" values.

Additionally, first and second transition streams, 1050 and 1055, are generated at embedding modules T0→1 (1035) and T1→0 (1045).

Note that the embedded frames marked with an 'X' do not need to be generated since they are never selected for target content generation. This is true since the transitions are always confined to the transition frames, e.g., C(0→1), C(1→2), etc.

The final target content stream 960, including the transition frames C(1→2) and C(0→1), is output from the mux 250 based on the selection signal from the user data stream 1020.

Several other variations are possible for the present invention, including:

Using the pre-processed embedding system with compressed content. That is, embedding the binary data into compressed audio, video or other digital data;

Using unequal length segments or variable data rates;

Basing the segment boundaries on error correction boundaries, packet boundaries, or other signal-specific construct;

Structuring the unique identification (ID) value, or adding redundancies (e.g., error correction or error checking) to deter collusion attacks. An example is the use of one PN sequence for "0" and another PN sequence for "1", rather than binary phase shift keying (BPSK), which uses one PN for both "0" and "1".

Accordingly, it can be seen that the present invention provides a system for providing a composite data signal to a user with embedded information that identifies the user.

In an embodiment which is particularly suitable for on-line distribution of content, two copies of the content may be pre-processed and stored, e.g., at a server used by an on-line distributor. Each copy has data embedded in successive segments therein that indicates a logical value, such as a binary zero or one. The segments are assembled according to a desired identification signal to provide a composite signal that is delivered to the user. In the event of illicit copying or distribution of the content, the original user can therefore be tracked from the illicit copies.

Optionally, instead of pre-processing and storing two copies of the content, the content can be processed and forwarded to the user on a real-time basis. This particularly desirable when the content is a live event.

In a further variation, which is particularly suitable for multicast transmissions to user terminals, data embedding modules are provided at the user terminals.

Moreover, while the embedding process is usually carried out in the digital domain, but once the information is embedded, it can be carried in the host signal in digital or analog form.

It may be advantageous to further reduce the memory, bandwidth and computational complexity of the systems and apparatus of present invention discussed above. It may also be advantageous to perform the majority of computationally expensive operations at one stage of the watermark embedding process while reducing the computational complexity of other stages of the embedding process.

The foregoing can be accomplished by reducing the size of the pre-processed content signals subsequent to the pre-processing with logical values. Thus, instead of providing two "full-scale" copies of pre-processed content, one or more "reduced-scale" pre-processed content signals may be produced. Particular segments of the reduced-scale pre-processed content signal(s) may then be selected in accordance with a control signal and combined with a version of the original content signal to produce a composite embedded host content.

The term full-scale is used herein to describe the pre-processed content signals that are substantially similar to the original content signal. This similarity is a requirement of the system in order to produce substantially imperceptible watermarked content. Producing two full-scale versions of the content, however, requires twice the bandwidth or storage capacity as compared to the original content. It was previously disclosed above that the required transmission bandwidth may be reduced by transmitting one of the embedded (or unmarked) signals, and only occasionally transmitting both versions of the embedded content. Other techniques for the reduction of transmission bandwidth are also possible. The term reduced-scale is used herein to refer any signal with a smaller information content than the original content. For example, such signal may have a smaller duration, dynamic range, bandwidth and/or spatial resolution than the original content. These properties can be advantageously used to reduce the storage or transmission requirements of the system. In applications where ample computational resources are available, manipulating two full-scale versions of the original content may be perfectly acceptable, but in other applications this may not be feasible. For example, it may be desired to include a transactional/forensic watermark in audio or video portions of a feature film before each movie presentation. It is certainly possible to store two full-scale versions of the content, embedded with logical zeroes and ones, and then cut-and-splice the desired segments to produce the final embedded content. Alternatively, it may be advantageous to produce one full-scale and one reduced-scale signal that can be combined to produce the final embedded content. This can be accomplished as follows:

Step 1: pre-process the original content signal with a first logical value to produce a first pre-processed (full-scale) content signal (let's call this signal $O+w1$);

Step 2: subtract the original content signal from the first pre-processed content signal to produce a first reduced-scale signal (let's call this signal $w1$);

Step 3: pre-process the original content signal with a second logical value to produce a second pre-processed (full-scale) content signal (let's call this signal $O+w2$);

Step 4: subtract the original content signal from the second pre-processed content signal to produce a second reduced-scale signal (let's call this signal $w2$);

Step 5: subtract the signal generated in step 2 from the signal generated in step 4. Note that the same signal may be obtained by subtracting the signal generated in step 1 from the signal generated in step 3 (let's call this signal $w2-w1$).

Step 6: store or transmit the signals generated in step 1, $(O+w1)$ and in step 5, $(w2-w1)$.

Step 7: in accordance with a control signal, select certain portions of the signal generated in step 5, $(w2-w1)$, and add it to the signal generated in step 6, $(O+w1)$, to produce the final embedded content.

The procedure described above only requires the transmission/storage of one full-scale signal, embedded with one logical value, plus one reduced-scale signal comprising the differences between the embeddings of the two logical values. It is possible to further reduce the size of stored/transmitted data by replacing the reduced-scale signal by a set of embedding parameters that are subsequently used in accordance with the control signal to modify portions of the original content embedded with one logical value into portions with a second logical value. For example, in certain embedding algorithms, a logical '1' may be embedded by applying a fixed "gain" value to the original content (or to a carrier signal that is subsequently added to the original content) while a logical '0' may be embedded by applying the same fixed gain, with opposite sign, to the original content (or to a carrier signal that is subsequently added to the original content). In order to change one embedded logical value to the other in this scheme, it suffices to apply the gain at, for example, roughly twice the strength and in opposite polarity of the original embedding. Thus, in its simplest form, this technique only requires the storage/transmission of one full-scale signal, embedded with a first logical value, and the gain value that is necessary to incorporate a second logical value into the content signal (or into a carrier signal that is subsequently added to the content signal). Other parameters such as synchronization information, masking information related to the host content, anti-collusion measures, bit transition functions, and the like, may also be part of the store/transmitted signals.

Figure 11:
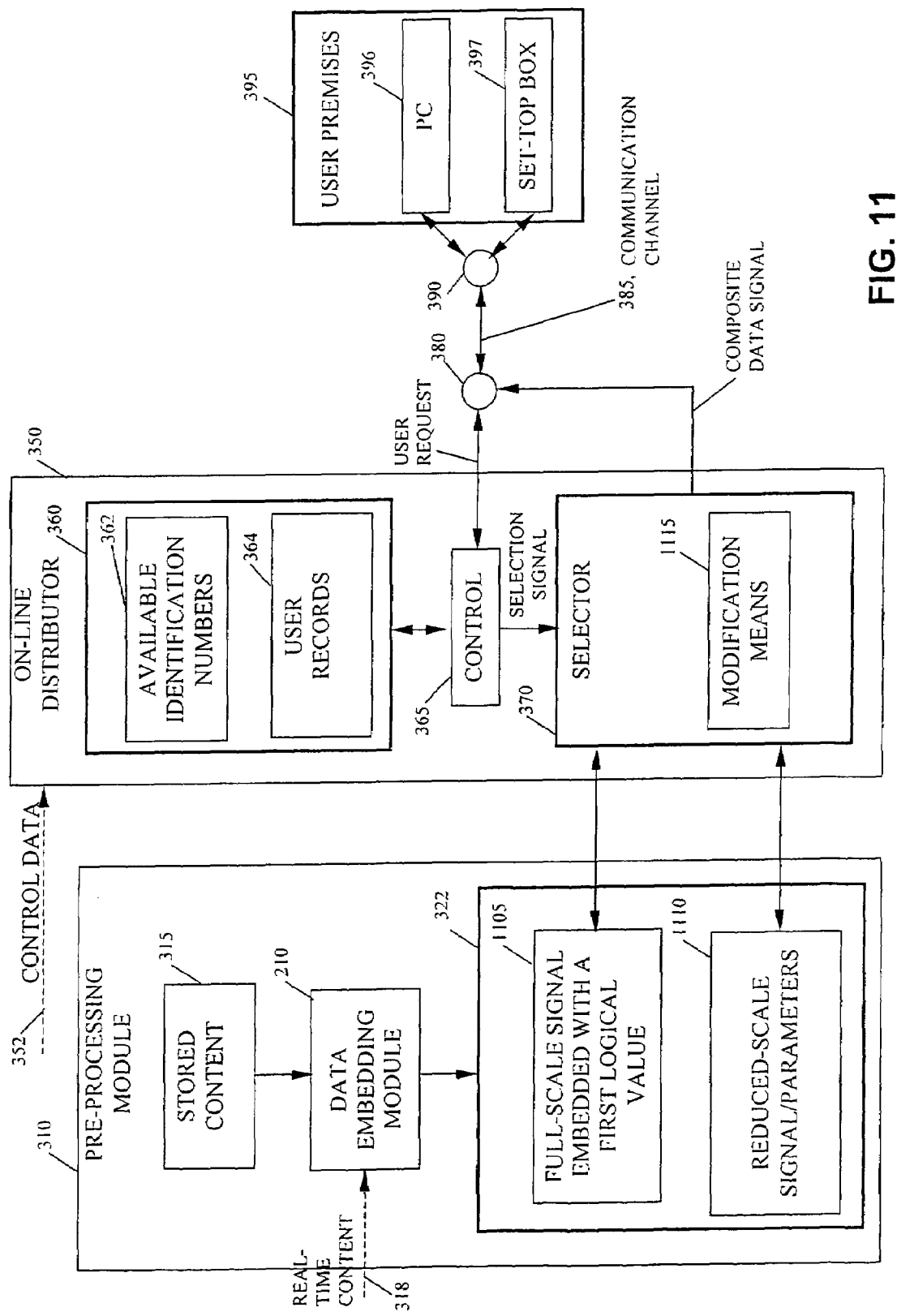
FIG. 11 illustrates a second example embodiment of a pre-processing module and on-line distribution system for distributing digital or analog content in accordance with the present invention.

FIG. 11 illustrates an example embodiment of the present invention in the context of on-line distribution of content of FIG. 3, wherein a full-scale content embedded with a first logical value 1105 is stored in a memory module 322 along with a reduced-scale signal/parameters 1110 necessary to modify the segments of the content embedded with a first logical value to contain the desired watermark values. The modification of the full-scale signal is conducted in accordance with the control signal (also referred to herein as a "selection signal") from control 365 using the modification means 1115.

Although the example embodiment of FIG. 11, and other examples disclosed herein, are described in the context of an on-line distributor of a content, it is understood that the described concepts and methodologies are equally applicable to architectures that insert multiple forensic watermarks at multiple locations within the distribution system, including at the user (i.e., client) premises (e.g., a system analogous to the one depicted in FIG. 6). In fact, in such systems, it may be advantageous to effect forensic watermarking using reduced-scale signals. The major advantages of such a system can be summarized as follows: 1) bandwidth and storage savings, which could result in faster access times and transfer of the content; 2) enhanced security, since only parts of the original content (i.e., in the form of reduced-scale signals) are required to be shipped around to different locations that are not necessarily secure; 3) computational savings, since the user platform needs to process a small amount of data and perform a limited number of computations; 4) protection of embedding secrets, since most of the embedding parameters and algorithmic secrets may only be maintained at secure pre-processing center; and 5) flexibility and renewability of watermarking algorithms and parameters, as it may be possible for the pre-processing center to send (and for a user to receive) new and different instructions, parameters, or data that comprise the reduced-scale signal, which would be particularly useful if a watermarking algorithm is compromised.

The embedding procedure described in accordance with the example embodiment of FIG. 11 may be further modified to include the generation of a full-scale signal that does not necessarily contain embedded logical values but is modified in a pre-processing step to facilitate subsequent embedding of logical values. In particular, it is well known that host signal may represent a major source of interference for the detection of watermarks, i.e. host signal can be considered as noise in a watermark communication channel. Therefore, most well-designed watermark systems calculate these interfering effects of the host signal over the watermark symbol interval prior to the embedding, and then adjust the embedding parameters in order to achieve optimum tradeoff between watermark robustness and transparency. The calculation of host signal interference may require significant memory and processing resources and introduce significant latency in the embedding process. In accordance with another example embodiment of the present invention, these calculations and the necessary modifications of the host signal can take place in a pre-processing step. The result of the pre-processing would be a host signal in a pre-defined 'state' with known interference effects on any would-be embedded watermarks.

For example, for an auto-correlation modulation embedding scheme, described in U.S. Pat. No. 5,940,135 and assigned to the assignee of the present invention, the short-term auto-correlation value of the host signal is typically modulated to become either a positive value or a negative value in order to embed a '1' or a '0', respectively. An example pre-processing step, in accordance with the present invention, would be to modify the short-term autocorrelation of the host signal to be in a neutral state (e.g., be zero-valued) for each bit interval. This way, at the client end of the embedding system, there is no need to calculate the short-term auto-correlation value of the host signal since it is already known to be zero. The embedding of logical values may then be effected by simply generating the so-called 'host modifying signal' (i.e., a delayed or advanced version of the host signal) and multiplying it by parameters such as a constant gain value, a psycho-acoustical gain factor (which could also be pre-calculated), a sign value indicative of the logical value to be embedded, and other parameters. This technique provides significant computational savings and greatly improves the speed of embedding at the client side. The improvement in latency of embedding is mostly due to the fact that there is no need to calculate a gain value, and related autocorrelation value, for the entire bit interval.

Another example is a spread-spectrum watermark encoding system described in U.S. Pat. No. 5,940,429 and assigned to the assignee of the present invention. In the encoder of this system, a cross-correlation calculation between the pseudo-random sequence carrier and the host signal determines the amount of host signal interference. Subsequently, a compensation term is calculated and applied to the host signal, at the encoder, to reduce or remove the noise components due to the host signal. In accordance with the embodiments of the present invention, this 'cross-term compensation' operation may be done at a pre-processing stage. Thus the embedding at the client end of the embedding system may simply be reduced to modulating the pseudo-random sequence carrier in accordance with information bits that are being embedded. If it were possible to store or generate the pseudo-random sequence carrier and other embedding parameters, such as an embedding gain value, at the client side, it would only suffice to transmit one full-scale signal, i.e., the pre-compensated host signal, in order to carry out the remainder of the embedding process at the client side. The pseudo-random sequence carrier may then be generated at the client premises, modulated with logical values in accordance with a control signal, comprising the appropriate watermark logical values, and added to the pre-compensated host signal to produce a composite signal with embedded watermarks. Other information related to, for example, synchronization, masking properties of the host content, and the like, may also be transmitted to the client.

The above examples related to auto-correlation modulation and cross-term compensation watermark embedding techniques were presented to illustrate two possible implementations the present embodiment. Many other implementations and variations of this general technique are also possible. In general, the host content may be pre-processed to be in a first set of one or more pre-defined states. Then logical values may be embedded into the host content by further modifying the content to be in a second, third, forth, . . . , N, set of pre-defined states.

In another example embodiment of the present invention, it may be advantageous to transmit/store two reduced-scale versions of the pre-processed content, corresponding to only the watermark signal (e.g., the difference between the embedded and original contents) for each embedded logical value. The final embedding may be carried out by selecting the desired segments of each reduced-scale signal and combining them with the original content to produce the watermarked content. Thus the storage/transmission requirements of the watermarking system are reduced to having to deal with only the original content plus two reduced-scale signals. This technique produces the advantage of reducing the transmission/storage requirements while delivering an intact version of the original signal (i.e., a version without any processing and void of any embedded logical values) prior to the insertion of watermarks. There may be many reasons for selecting to deliver an un-embedded version of the original content prior to the embedding of watermarks. These may include avoiding any potential damages to the embedded logical value due to lossy transmission of the content (e.g., lossy compression) or the desire to embed watermarks with variable strengths into the content. The latter will be described in further detail below. Furthermore, this technique enables the embedding of pre-existing content that is already at the user premises or is delivered to the user premises through a separate communication channel devoid of any embedded logical values.

Figure 12:
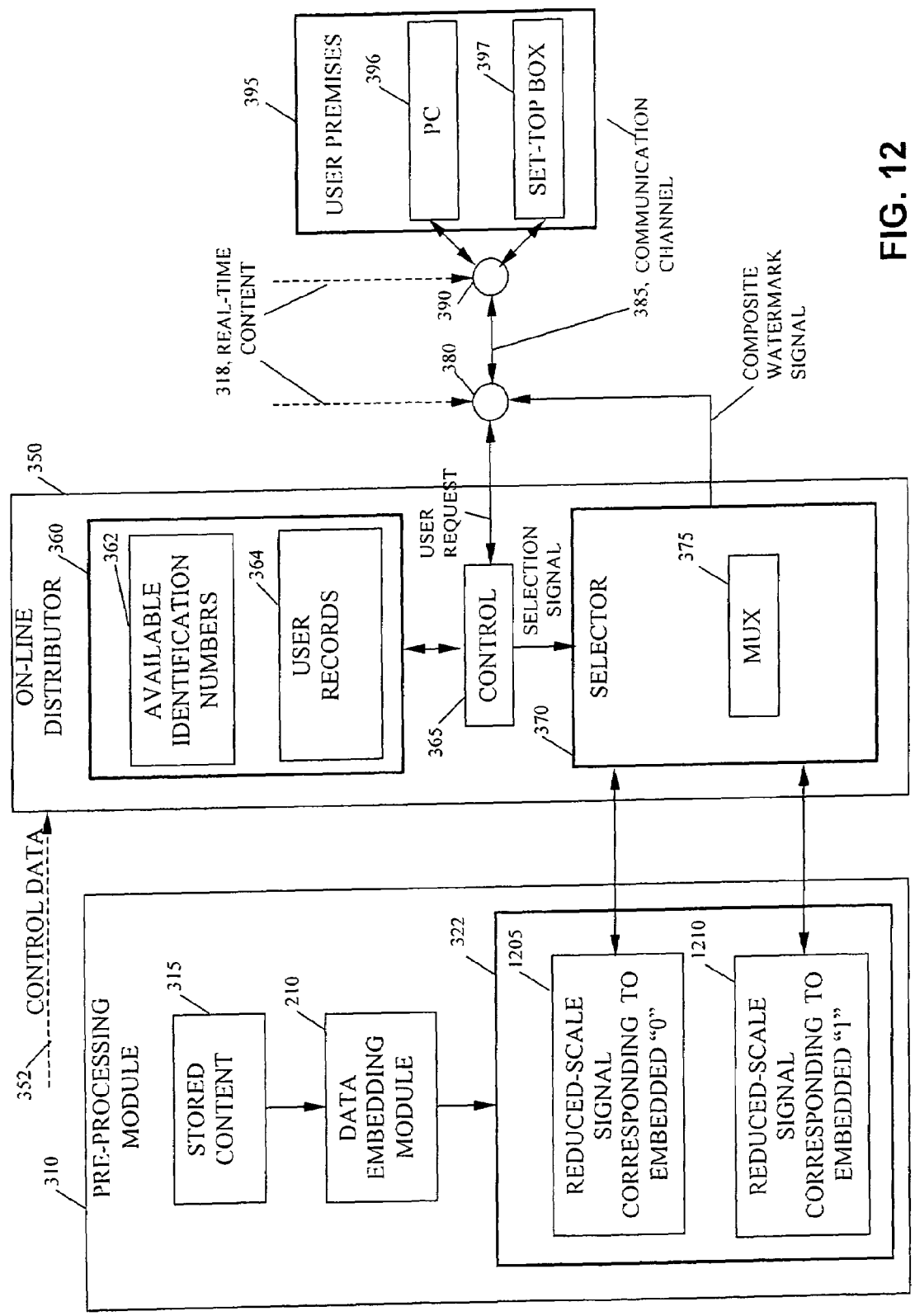
FIG. 12 illustrates a third example embodiment of a pre-processing module and on-line distribution system for distributing digital or analog content in accordance with the present invention.

FIG. 12 illustrates a further example of an on-line content distribution system that employs reduced-scale signals to effect embedding of watermarks in accordance with the present invention. This figure is similar to FIG. 3 but the memory 322 contains two reduced-scale signals 1205 and 1210 that correspond to embedded zeros and ones, respectively. These signals are shown as two separated entities in FIG. 12. It should be understood that various data compression techniques may be used to reduce the size of each stored signal individually or collectively. For example, a differential compression scheme may be used that relies on the differences between the two signals to reduce the size of memory 322. The on-line distributor Module 350 is responsible for selecting the appropriate segments of the reduced-scaled signals in accordance with the control signal. These segments may then be multiplexed at MUX 375 and then combined with a real-time content 318 at nodes 380 or 390. The exact location of this combination may be up to the system architect and should be based on available resources or security concerns. If this combination occurs at node 380, then a full-scale watermarked content may be generated and transmitted to the user via the communication channel 385. If the combination were to occur at node 390, a smaller bandwidth for the transmission of the watermark signal would be required but this necessitates the delivery of the content signal 318 to node 390, as well as the presence of combination means at this node. Furthermore, the original content and/or the composite watermark signal may have to be delivered in an encrypted form in order to ensure security of the process, especially if node 390 resides in an unsecured environment such as the user premises 395. It is also possible to forgo the multiplexing operations at the on-line distributor 350, deliver the reduced-scale and control signals directly to the user premises 395 and modify the original content signal at the user premises 395 to produce a watermarked signal. FIG. 12 shows a PC 396 and a set-top box 397 as an example of several possible apparatus that may exist at the user premises 395. It is understood that other devices such as television sets, mobile phones, hand-held devices, and the like, may be used at the user premises 395 (or elsewhere) to conduct the same activities.

There are various ways of producing the above described reduced-scale signals, which depend on the particular embedding algorithms, nature and type of the content, and the amount of resources available. One simple technique involves the embedding of the content with logical '0' values to produce a first embedded content, subtracting the original content from the first embedded content to produce a first difference signal corresponding to embedded zeroes, embedding the original content with logical '1' values to produce a second embedded content, subtracting the original content from the second embedded content to produce a second difference signal corresponding to embedded ones, storing/transmitting the first and second difference signals together with, or separate from, the original content, selecting particular segments of the first and second difference signals in accordance with a control signal, and adding the selected segments to the original content to produce a watermarked content. There are certainly many other ways of generating the reduced-scale signal. For example, some embedding techniques require the multiplication of the original signal by the watermark signal. The "difference" signals, in this case, may be generated by pre-processing the content in accordance with the logical values and calculating the ratios between the pre-processed and original content signals.

It is also possible to produce the reduced-scale signals independently from the original content. In such cases, typically an independent carrier signal is generated and processed in accordance with a first logical value to produce a first reduced-scale signal, the original carrier signal is also processed in accordance with a second logical value to produce a second reduced-scale signal, the two reduced-scale signals are stored/transmitted together with, or separately from, the original content, then particular segments of one or both reduced-scale signals are selected in accordance with a control signal and combined with the original content to produce a watermarked content. The adaptations of the carrier signal may involve any one of standard modulation techniques (e.g., AM, FM, PSK, or the like) or other specifically developed modulation or adaptations techniques. The combination of the reduced-scale signals with the original content must not produce perceptible artifacts in the combined signal. This often requires the analysis of the original content signal in order to tailor the strength of the reduced-scale signals to the characteristics of the original content (e.g., to take advantage of masking properties of the original content). This psycho-acoustical or psycho-visual analysis may be conducted prior to, or at the same time, as the combining of the reduced-scale signals with the original content. Thus the original content may be analyzed and the reduced-scale signal may be adjusted in accordance with the outcome of the analysis prior to the transmission/storage of the reduced-scale signals. Alternatively, content analysis and appropriate adjustments may be done on-the-fly during the combining stage of the reduced-scale signals with the original signal.

It is also possible to forgo such content analysis and produce appropriately scaled signals that produce generally imperceptibility watermarks. For example, a set of pre-determined adjustment parameters may be generated based on the usage of the watermarking system (e.g., theatrical presentation vs. Internet release), the nature of the original content (e.g., animation feature film vs. action movie), or other classifications, and used to appropriately adjust the reduced-scale signals. This technique is well suited for inserting watermark signals into live events (i.e., real-time embedding), where there is not enough time to conduct on-the-fly content analysis. Determination of such pre-determined adjustment parameters may be done by identifying and categorizing a large number of content based on the genre, usage, target audience, value of the content, distribution channel, or other classifications. This collection of content may then be analyzed once to produce the appropriate adjustment parameters for each content category; these parameters may then be used for all future adjustments of the reduced-scale signals for content falling within each content category. The reduced-scale signals produced using such pre-determined adjustment parameters, when combined with the original content, may not produce an optimally imperceptible embedded signal. However, for a properly designed watermarking system, the presence of any perceptible artifacts should not be objectionable since these artifacts are likely to be of low amplitude and not perceptible to all users at all times. Of course, it is also possible to further simplify the above technique by selecting a single universal set of adjustment parameters for all content, for example, by calculating an average set of adjustment parameters. The proper choice should be made by considering the tradeoffs between imperceptibility, security and computational complexity of the watermark embedding and detection systems.

Another variation of the above technique involves performing the computationally expensive operations of the embedding process once, generating parameters or signals that convey the results of theses operations, transmitting/storing these parameters or signals together with, or separate from, the original content and applying the parameters or signals to the original content at subsequent times or locations to produce the final embedded content. These computationally expensive operations may comprise any or all computations that are necessary to carry out the watermark embedding process, including, but not limited to, watermark packet construction, error control coding, gain calculations, content analysis for determination of psycho-visual and psycho-acoustical factors, anti-collusion and watermark masking procedures, compression or decompression, or partial calculations involving transformations, filtering, FFT calculations, correlation calculations, and the like. The results of such computations along with any other required information or signals (e.g., carrier signal, synchronization information, and the like) may be combined and undergo further operations (e.g., compression, encryption, scrambling, modulation, and the like) to produce signals that are suitable for storage or transmission. The generated parameters or signals may then be combined with the original content signal at a different times or locations without requiring a considerable amount of storage capacity, transmission bandwidth or computational capability.

Figure 13:
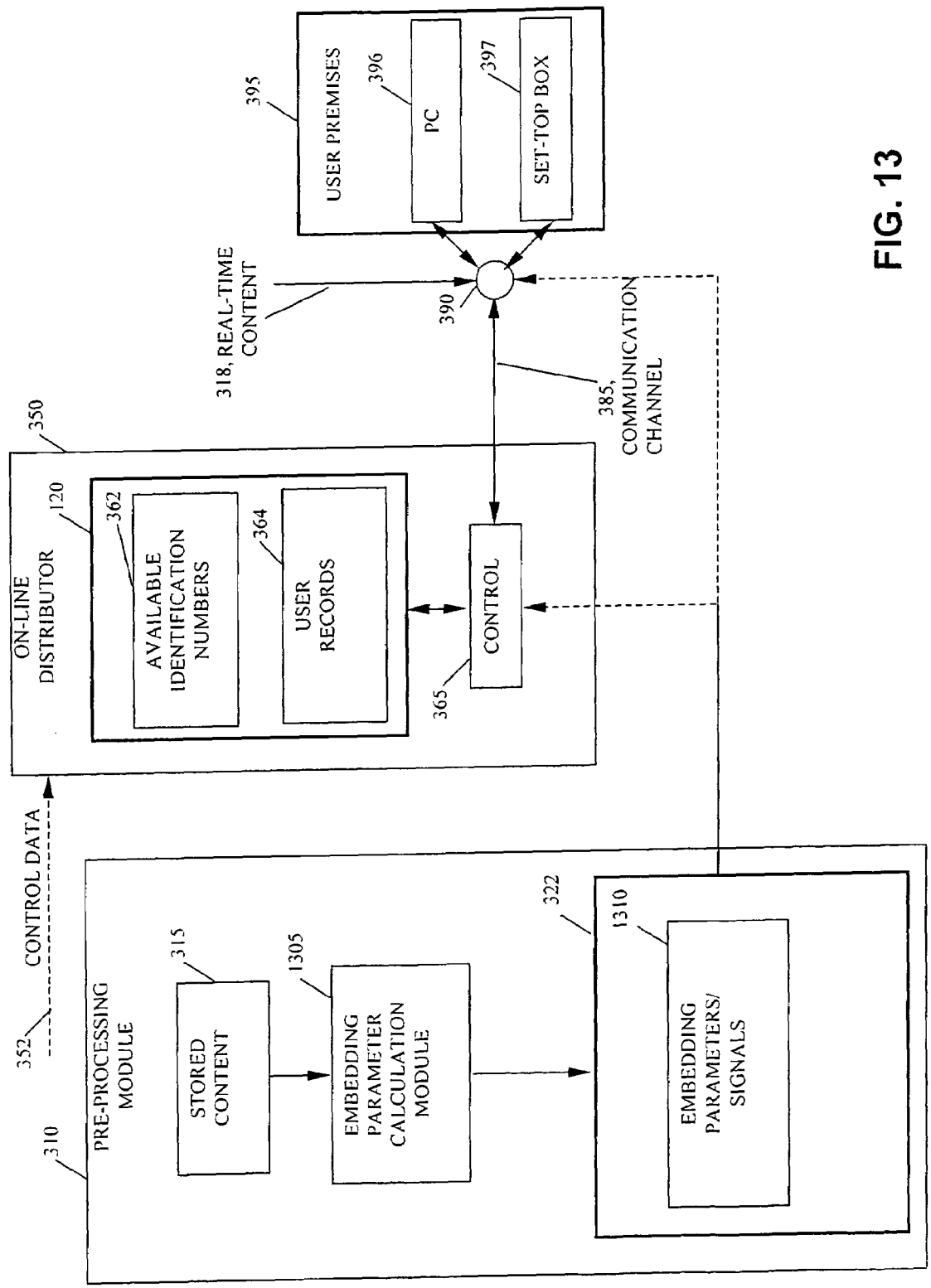
FIG. 13 illustrates a fourth example embodiment of a pre-processing module and on-line distribution system for distributing digital or analog content in accordance with the present invention.

FIG. 13 illustrates another an example embodiment of an on-line content distribution system that utilizes embedding parameters or signals in accordance with the present invention. The Embedding Parameter Calculation Module 1305 performs various full or partial calculations that produce embedding parameters or signals necessary for embedding of watermarks. The embedding parameters/signals 1310 produced by the Embedding Parameter Calculation Module 1305 are stored in memory module 322. These embedding parameters/signals 1310 may include parameters, functions, instructions or signals. The on-line distributor Module 350 is responsible for selecting the sequence of symbols (e.g., bits) to be embedded in accordance with the control signal from control 365. The real-time content 318 is then processed in accordance with the embedding parameters or signals 1310 and the control signals at node 390 to produce the embedded content. The embedding parameters of signals may be grouped together with the control signal and transmitted to node 390 via communication channel 385. Alternatively, the embedding parameters or signals may be directly transmitted to node 390. It is also possible to perform a portion of embedding procedure at one location, for example, node 385, and the remaining portions at another location, for example, node 390. The exact choice is up to the system architect and should be based on available resources or security concerns. As mentioned earlier in relation to FIG. 11, the node 390 may entirely reside inside the user premises 395 and the devices within the user premises 395 may be any one of consumer electronic devices such as television sets, mobile phones, hand-held devices, and the like.

The above technique enables distributed embedding of the content, where components of the embedding system can be distributed among different physical locations with potentially different computational capabilities. For example, for placing individual watermarks into each movie presentation, the various computations involved in calculating and producing the correct watermarks, including content analysis or gain calculations may be carried out at a pre-processing center with ample processing capabilities. The generated signals or parameters may then be sent to a presentation venue with limited processing capabilities, and at the time of presentation, watermarks signals may be applied to the original content in accordance with proper instructions. This architecture also provides the capability to renew or change the watermarking algorithms and parameters. The new instructions, functions or parameters may be transmitted to the destination (e.g., user premises), where the insertion of watermarks can take place. This is particularly beneficial if a given watermarking technique (or its secret parameters) are compromised. Other variations of the above technique, include hybrid approaches, where partially-conditioned reduced-scale signals are produced along with accompanying parameters that can be used, at subsequent times/locations, to effect embedding of watermarks. For example, a first and second partially-conditioned reduced-scale signals, corresponding to embedded zeroes and ones, respectively, can be produced along with the results of content analysis (e.g., masking parameters or thresholds), other potential watermark gain-related parameters and the appropriate bit transition functions (see, for example, FIG. 9). This collection may then be sent to another location and used to embedded appropriate watermarks into the host content.

One application of such a hybrid system involves tailoring the embedded watermark in accordance with the value, quality, usage or a user of the embedded content. For example, an original content with pre-existing artifacts (e.g., a content delivered in a highly compressed format) may lack adequate frequency components or dynamic range that is required for the insertion of fully robust watermarks. In this case, the partially-conditioned reduced-scale signals may be applied to the host signal with a higher gain value, whereas for an original content that is delivered in pristine condition, a lower gain watermark signal may be applied. Other than tailoring the reduced-scale signals to compensate for the transmission channel quality, watermark adjustments may be made to discriminate between different customers or content prices. For example, a trusted video artist may pay more for a content with no or very little perceptible artifacts while a low-paying customer may obtain a content with some perceptible artifacts (which means the content contains stronger watermarks that are more immune to transformations and attacks). Furthermore, the strength of embedded watermarks may be adjusted based on the requirements or characteristics of the target destination. For example, a content delivered to a home theatre system may have a higher fidelity requirements than the same content delivered to a cellular phone. Thus the embedded watermark strength or insertion locations may be adjusted accordingly to produce different levels of watermark transparency, robustness or resistance to removal attempts. Another example includes the scenario in which the content is pre-screened for the presence of pre-existing watermarks and upon their detection, the adaptations of the reduced-scale signals are carried out differently (e.g., with a larger gain or an additional offset). It is further possible to utilize the accompanying parameters to apply the watermark with excessively high gain values in order to produce a fully or partially obscured content. This may be applied, for example, in cases where the user's subscription has expired. In general, it may be advantageous to produce a set of partially-conditioned reduced-scale signals as well as additional parameters, functions, instructions or signals that can be used to tailor the watermark signal in accordance with a control signal and a set of pre-defined conditions. Furthermore, these adjustments may be done at several locations throughout the distribution path of the content or watermark generation stages.

The generation and/or transmission of supplementary signals, such as synchronization and timing signals, may also be necessary in order to perform the various watermarking operations of the present invention. These signals may, for example, indicate when to start or stop embedding of particular bit value. The supplementary signals, comprising synchronization information, can be incorporated into the control signal used for controlling the cut-and-splice action of the full-scale or reduced-scale signals, or may be generated externally from, for example, an existing SMPTE Linear Time Code. The presence and accuracy of such timing information may also depend on the watermark embedding algorithm. For an embedding algorithm that employs a host-independent watermark carrier signal (e.g., a spread-spectrum watermarking system), the exact alignment of the original content and the watermark signal may not be critical for the detection of watermarks. Any misalignment, in this case, may produce some perceptible artifacts in the host signal but would still produce detectable watermarks. In contrast, for host-dependent watermarking algorithms (e.g., auto-correlation modulation watermarking), the correct alignment of the two signals is necessary for proper detection of watermarks.

While the specific examples provided throughout this disclosure have illustrated the embedding of single watermarks into a content, it should be understood that these techniques may be readily extended to enable the insertion of multiple watermarks, at multiple transaction points, within a content distribution network. For example, a first watermark may be inserted into a first set of locations within the original content at a first transaction node, before the content is passed on to a second transaction point, where a second watermark may be inserted into a second set of locations, different from the first set of locations, and so on. Each embedded watermark may contain the identity of the transaction node, the date and time of embedding, the identity of the next node, and the like. The embedding of watermarks may be enabled by delivering the appropriate full-scale signals, reduced-scale signals and/or auxiliary parameters to each transaction node and carrying out the embedding of watermarks in accordance with any one the various embodiments of the present invention. Furthermore, it may be necessary to deliver additional parameters or signals to indicate where subsequent watermarks may be placed or how to avoid over-writing of the existing watermarks. Alternatively, at each transaction point, the content signal may be analyzed to discern the locations of pre-existing watermarks or to search for specially embedded markers that indicate the boundaries of pre-existing watermarks.

Combining the reduced-scale signals with the original content and/or modifying the original content in accordance with the pre-calculated embedding parameters or signals can be carried out using a variety of digital or analog techniques. In the digital domain, a variety of digital signal processing apparatus and devices may be used. These may include personal computers, specially designed apparatus comprising at least one of ASIC, FPGA and microprocessor devices, and the like. In analog domain, a variety of analog components including op-amps, transistors, analog ASICS, and the like, can be used. In general, most signal processing operations can be done in analog, digital or mixed-signal (i.e., part analog, part digital) domains. In addition, one can easily move from one domain to another using A/D and D/A operations.

Obviously, in an all-digital domain, such as an on-line content distribution environment, it may be advantageous to use all-digital techniques. Similarly, it may be advantageous to utilize all-analog techniques in an analog environment. For example, the vast majority of today's movies are delivered to movie theatres on reels of optical film that are projected using relatively inexpensive optical projectors. The sound track is also delivered in one analog format (on the optical film itself) as well as several digital formats (e.g., Dolby, DTS, etc.). The insertion of watermarks in movie theatres, using digital techniques, while theoretically possible, may not be economically feasible. This would obviously not be the case if and when digital delivery of movie content becomes a viable option. In such analog environments, analog addition of watermark signals may be the best option. Audio watermarks, for example, may be added by placing an "adder" box in the analog audio output path of the sound system. This is made possible by the fact that all audio signals, regardless of their original format, must be converted to analog electrical signals in order to be played out on the speakers. Such an adder box may include inexpensive analog components that are used to apply the appropriate watermark signals, generated in accordance with the various embodiments of the present invention, to the movie sound track. In designing such systems, care must be taken not to introduce noticeable processing delays that could produce audio-video synchronization problems.

Alternatively, the addition of watermarks may be done using optical and acoustical techniques. Since the movie must be eventually projected onto a screen and the sound track must be played out in the theatre, it may be possible to convert the watermark signals, generated in accordance with the various embodiments of the present invention, into optical and/or acoustical domains and appropriately combine them with the original movie content as it is being played out. This combination in the optical domain may be carried out by modulating the original movie with appropriate watermark signals as the movie is being projected. Such optical modulation techniques may be done using spatial light modulators or by the placement of pre-manufactured watermarking masks in the optical projection path of original content. Alternatively, the generated watermark signals may be projected separately onto the movie screen so that their superposition with the original content would produce a watermarked content. Analogously, acoustical techniques may be used to incorporate audio watermark signals into the movie sound track. For example, the acoustical signal of the sound track may be modulated in accordance with the appropriately generated watermark signal using acoustical modulators. Alternatively, the watermark signal may be acoustically generated and played out simultaneously with the original sound track using separate speakers.

The various embodiments of the present invention may also be used for inserting watermarks into printing systems. One example of such a method would be to use the generated watermark signals to modulate the "print head" of different printer systems. For example, in a laser printing system, the generated watermark signal may modulate the laser power; in an inkjet printing system, the watermark signal may modulate the inkjet stream, and the like.

It should be appreciated by those skilled in the art that the techniques disclosed above may also find applications in various document preparation and duplication systems. For example, when creating an e-document, in the form of an Adobe Acrobat® file, two instances of the document, one encoded with logical '1' and the other encoded with logical '0' may be created (which can be done on a per-page basis). When the e-document is distributed to the end user, a copy can be created by interleaving pages embedded with a '1' value with pages that are embedded with logical '0' value to produce a watermarked e-document.

Another example involves a person who purchases a textbook and decides to use a copier to mass-replicate pirate copies. Most copiers initially scan the document (one-page at a time or all at once) and then produce the hard copy duplicates. A copier that is equipped with a transactional watermark embedder may embed the two logical values into the scanned image to produce two copies of the original. Then, particular segments of each embedded image may be selected and assembled to produce the final image that is sent out as a hardcopy. The embedded watermarks may convey information that is useful for tracking the origins of the copy, for example, GPS co-ordinates of the copy machine, time and date of creation of the copy, IP address or serial number of the copy machine, and the like. The same techniques may be applied to insert unique identifiers to classified or controlled documents. This may be accomplished, for example, by instructing the printer driver to go into transaction watermark mode, and cut-and-splice particular pages from the zero- and one-embedded master images to create uniquely embedded printed outputs.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for embedding auxiliary information symbols in a host content, comprising:
   producing a first reduced-scale content corresponding to a plurality of segments of said host content embedded with a first logical value;
   producing a second reduced-scale content corresponding to said plurality of segments of said host content embedded with a second logical value; and
   selecting a first set of segments from said first reduced-scale content and a second set of segments from said second reduced-scale content in a pre-defined manner to produce a composite watermark, wherein a combination of said composite watermark with said host content produces a composite embedded host content.

2. The method of claim 1, wherein said pre-defined manner identifies an entity.

3. The method of claim 1, wherein said pre-defined manner identifies a transaction.

4. The method of claim 1, wherein said combining occurs at user premises.

5. The method of claim 1, wherein said composite embedded host content is transmitted and subsequently received at a display device.

6. The method of claim 1, wherein said host content comprises at least one of audio, video, text, or programming information.

7. An apparatus, comprising:
a pre-processor configured to produce a first reduced-scale content corresponding to a plurality of segments of a host content embedded with a first logical value, and a second reduced-scale content corresponding to said plurality of segments of said host content embedded with a second logical value; and
a selector configured to select a first set of segments from said first reduced-scale content and a second set of segments from said second reduced-scale content in a pre-defined manner to produce a composite watermark, wherein a combination of said composite watermark with said host content produces a composite embedded host content.

8. The apparatus of claim 7, wherein said pre-defined manner identifies an entity.

9. The apparatus of claim 7, wherein said pre-defined manner identifies a transaction.

10. The apparatus of claim 7, wherein said combining occurs at user premises.

11. The apparatus of claim 7, wherein said composite embedded host content is transmitted and subsequently received at a display device.

12. The apparatus of claim 7, wherein said host content comprises at least one of audio, video, text, or programming information.

* * * * *

UNITED STATES PATENT AND TRADEMARK OFFICE
CERTIFICATE OF CORRECTION

PATENT NO. : 7,644,282 B2  Page 1 of 1
APPLICATION NO. : 11/173948
DATED : January 5, 2010
INVENTOR(S) : Petrovic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 943 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,644,282 B2
APPLICATION NO. : 11/173948
DATED : January 5, 2010
INVENTOR(S) : Rade Petrovic et al.

It is certified that error appears in the above-identified patent and that said Letters Patent is hereby corrected as shown below:

In Column 20, Line 37, please delete "theses" and insert -- these --, therefor.

In Column 21, Line 15, after "location," please delete "for example, node 385,".

Signed and Sealed this
Thirteenth Day of November, 2012

David J. Kappos
*Director of the United States Patent and Trademark Office*